US010807132B2

(12) United States Patent
Crichlow

(10) Patent No.: US 10,807,132 B2
(45) Date of Patent: Oct. 20, 2020

(54) NUCLEAR WASTE DISPOSAL IN DEEP GEOLOGICAL HUMAN-MADE CAVERNS

(71) Applicant: Henry B. Crichlow, Norman, OK (US)

(72) Inventor: Henry B. Crichlow, Norman, OK (US)

(*) Notice: Subject to any disclaimer, the term of this patent is extended or adjusted under 35 U.S.C. 154(b) by 0 days.

(21) Appl. No.: 16/285,199

(22) Filed: Feb. 26, 2019

(65) Prior Publication Data

US 2020/0273592 A1 Aug. 27, 2020

(51) Int. Cl.
| | |
|---|---|
| *B09B 1/00* | (2006.01) |
| *G21F 9/30* | (2006.01) |
| *G21F 9/34* | (2006.01) |
| *E21B 7/28* | (2006.01) |

(52) U.S. Cl.
CPC .............. *B09B 1/008* (2013.01); *G21F 9/304* (2013.01); *G21F 9/34* (2013.01); *E21B 7/28* (2013.01)

(58) Field of Classification Search
CPC .............. B09B 1/008; E21B 7/28; G21F 9/34
See application file for complete search history.

(56) References Cited

U.S. PATENT DOCUMENTS

| | | | |
|---|---|---|---|
| 2,174,587 A | 10/1939 | Love | |
| 3,108,439 A | 10/1963 | Reynolds | |
| 3,274,784 A | 9/1966 | Shock | |
| 3,864,208 A | 2/1975 | Van Huisen | |
| 4,189,254 A * | 2/1980 | Akesson | E21D 13/00 405/129.35 |
| 4,192,629 A * | 3/1980 | Hallenius | E21D 13/00 405/129.35 |
| 4,320,028 A | 3/1982 | Leuchtag | |
| 4,326,820 A * | 4/1982 | Uerpmann | G21F 9/24 405/129.35 |
| 4,573,540 A | 3/1986 | Dellinger | |
| 4,586,849 A * | 5/1986 | Hastings | B09B 1/008 405/129.35 |
| 4,906,135 A * | 3/1990 | Brassow | B09B 1/008 405/129.35 |
| 4,976,569 A * | 12/1990 | Braehler | B09B 1/00 405/129.35 |
| 5,850,614 A | 12/1998 | Crichlow | |
| 5,863,283 A * | 1/1999 | Gardes | B09B 1/008 166/290 |
| 6,137,028 A | 10/2000 | Snow | |
| 6,213,229 B1 | 4/2001 | Majkovic | |
| 6,238,138 B1 | 5/2001 | Crichlow | |
| 7,036,611 B2 | 5/2006 | Radford | |
| 7,097,386 B2 | 8/2006 | Maduell | |
| 7,156,579 B2 | 1/2007 | Castle | |
| 7,370,712 B2 | 5/2008 | Stout | |
| 7,832,500 B2 | 11/2010 | Garcia | |

(Continued)

*Primary Examiner* — Janine M Kreck
(74) *Attorney, Agent, or Firm* — Eric Kelly

(57) ABSTRACT

Systems and methods for long-term disposal of radioactive or nuclear waste materials, in liquid, solid, and/or other physical forms, into human-made caverns, within deep geologic rock formations, derived from a wellbore, are manufactured by use of drilling and reaming technologies. The radioactive waste may be preprocessed from original surface storage site(s), transported, temporarily surface stored, and then finally further processed at a selected well site before injection into the subterranean deep human-made caverns within the host rock (deep geologic rock formations).

22 Claims, 15 Drawing Sheets

(56) References Cited

U.S. PATENT DOCUMENTS

| | | |
|---|---|---|
| 8,020,635 B2 | 9/2011 | Radford |
| 8,196,679 B2 | 6/2012 | Radford |
| 8,281,879 B2 | 10/2012 | Elliot |
| 8,933,289 B2 | 1/2015 | Crichlow |
| 8,936,110 B2 | 1/2015 | Adam |
| 9,074,434 B2 | 7/2015 | Mensa-Wilmot |
| 9,284,120 B2 | 3/2016 | Oates |
| 9,475,128 B2 | 10/2016 | Sawabe |
| 9,574,406 B2 | 2/2017 | Davis |
| 10,315,238 B1* | 6/2019 | Muller .................. E21B 49/08 |
| 2005/0022416 A1* | 2/2005 | Takeuchi ................ B09B 1/008 |
| | | 34/380 |
| 2010/0234663 A1 | 9/2010 | Crichlow |
| 2012/0031671 A1 | 2/2012 | Propes |
| 2013/0112186 A1 | 5/2013 | Crichlow |
| 2016/0293282 A1* | 10/2016 | Burget ...................... G21F 7/00 |
| 2018/0290188 A1 | 10/2018 | Crichlow |

* cited by examiner

NUCLEAR WASTE DISPOSAL IN DEEP GEOLOGICAL HUMAN-MADE CAVERNS

TECHNICAL FIELD OF THE INVENTION

The present invention relates specifically to the containment, storage, and/or disposal of nuclear and/or radioactive materials within human-made subterranean cavities within deep geological formations.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

In the United States, the nuclear weapons production industry has left a massive and devastating legacy when the nuclear reactors were decommissioned at the end of the Cold War. For example, the weapons manufacturing process left behind about 53 million US gallons (volumetric equivalent of about 200,000 $m^3$) of high-level radioactive waste stored within 177 storage tanks. In addition, 25,000,000 $ft^3$ (710,000 $m^3$) of solid radioactive waste and a resulting contamination zone covering several square miles of contaminated groundwater beneath the site. Much of this liquid waste has been leaking into the surrounding earth creating significant health and environmental problems. There is a tremendous safety and environmental need to store and/or dispose of such radioactive materials.

In the past, it has been challenging, dangerous, and expensive to try to store radioactive and/or nuclear materials (such as waste materials) in underground caverns except for those cases where solid quantities of material are stored in barrels, individual capsular containers, slurry material, open pits and also within shallow mines which are very close to the surface.

There has not been any attempt to store radioactive materials in very deep caverns because: (1) such caverns do not generally naturally exist in rock formations at very great depths; (2) it has been impossible to fabricate or produce large diameter caverns or to implement them in deep enough geological formations which are necessary to maintain a level of safety such that there would be no migration of radionuclides from the radioactive materials to the surface over geologic time.

Underground human-made caverns have been used to store natural gas, hydrocarbon liquids, waste-water, petroleum products, and other commercial products for many decades. These caverns have generally been drilled into and/or leached from subsurface salt domes or salt formations which have been formed over geologic time by salt intrusions or depositions from regional seas or other long-gone aqueous environments.

Human-made salt caverns are typically created by injecting fresh water into subterranean salt formations and withdrawing the resulting brine. This process is referred to as solution mining. Over time, numerous human-made salt caverns have been solution mined by the petroleum industry for use in storing hydrocarbons like the Strategic Petroleum Reserves which holds hundreds of millions of barrels of crude oil; and for disposing of nonhazardous oilfield wastes (NOW). To date (circa 2019), human-made salt caverns have not been used to store and/or dispose of radioactive materials due to concerns that caverns may leak radioactive materials into surrounding rocks and, perhaps, into freshwater aquifers. Additionally, in underground gas storage operations, it has been demonstrated that over time the cyclic injection-production operations of the natural gas with the cycling of pressures inside the salt dome can create "salt creep" in which the human-made salt cavern becomes progressively smaller in volume and eventually useless as for large storage. Some better, more permanent mechanisms are needed for radioactive material storage and disposal.

The prior art has tried to dispose and store radioactive waste in leached-out salt caverns; some prior art has tried to inject the radioactive waste via horizontal fractures which are initiated from a vertical wellbore in an impermeable rock formation. However, the fracture width which is generated by the hydraulic fracturing pressure, is generally extremely small, about the size of sand grains, which are used generally as proppants within the fracture to keep them open for petroleum production in field operations. As such, the volumetric capacity of the fracture system which may be long at over a few thousand feet of length is still an insignificant storage volume for the storage and/or disposal of radioactive materials.

Besides, injecting slurries or similar complex mixtures of wastes into fractures which are themselves relatively small in diameter is problematic. The injected material could block the fractures after a small volume of material—a few hundred gallons—is injected. The ensuing pressure required to continue injecting the treated waste material at the volumetric rates needed, would be impractical in field operations since after the fractures are blocked, the host rock becomes the medium for flow transmission, and is substantially impermeable to fluid flow of the waste material and the rock would not transport the waste further into the host rock. The injection process would cease.

These two major prior art approaches to disposing of radioactive materials, i.e., leached out human-made salt caverns and fractured reservoir systems, do not provide the necessary solution for the safe storage and disposal of radioactive materials.

There is a long felt, but unmet, needs for means, systems, mechanisms, and methods that would allow high-level nuclear waste which exists in a variety of difficult to manage physical forms (e.g., liquids, sludges, powders, solids, etc.) to be stored and/or disposed of very deep within the earth and also in substantial quantities.

It is a requirement of this invention that the high-level nuclear waste be sequestered in large enough volumes and at a considerable enough distance below the surface of the earth to maintain the highest level of safety as possible.

A need, therefore, exists for a new method for to safely dispose of radioactive wastes in a controlled manner along with depositing these radioactive wastes in a system that is designed to meet the requirements of public acceptance along with regulatory guidelines.

It is to these ends that the present invention has been developed.

BRIEF SUMMARY OF THE INVENTION

To minimize the limitations in the prior art, and to minimize other limitations that will be apparent upon reading and understanding the present specification, embodiments of the present invention may describe means, systems, mechanisms, and methods for the storage and/or disposal of radioactive materials within human-made subterranean cavities within deep geological formations. In some embodiments, such stored and/or disposed of radioactive materials may be retrieved for auditing, inspection, technical, and/or operational reasons.

In light of the problems associated with the known methods of disposing of nuclear waste (including in liquid/slurry format), it may be an object of some embodiments, to provide a method for the disposal of nuclear waste in human-made caverns which is safe, with high volumetric capacity, cost-effective, and may be performed with modified oil field equipment.

It may be another object of some embodiments to provide a method of the type described herein wherein a human-made cavern of substantial strength and durability, with sufficiently protective walls and volumetric capacity may be formed in a deep geologic formation being several thousand feet below the earth's surface and wherein the human-made cavern may be several thousand feet in vertical extent with a reasonably large diameter of several feet. A human-made cavern of this size can provide close to 1,000,000 gallons of liquid radioactive waste storage. By enlarging the pilot wellbore to a significant diameter and continuing to vertically drill-out the cavity or cavern for up to several thousand feet, produces this permanent human-made phenomenon for radioactive waste storage and/or disposal.

Briefly, the disposal method in accordance with some embodiments of this invention may achieve the intended objectives by including the steps of: drilling a pilot well which intersects a deep geologic formation; and creation of a human-made cavern within that deep geological formation, using a well as described below, can be designed to allow the geometry of the cavern to be controlled so that the life of the cavern as a safe repository for nuclear waste can be maximized.

In recent years, in the drilling industries, over 2,500,000 feet of under-reaming drilling has been successfully achieved. The reaming technology in oil well drilling is not new. Reaming patents exist as early as 1939. However, the recent technological developments in the drilling industry have made it possible to help resolve the problems involved in making human-made caverns a reality in deep geologic zones.

Recently (2018), an oil well service company has published that it successfully drilled a 54-inch wellbore during an offshore well drilling from a drilling platform. Modifying such oilfield drilling technology allow implementation of embodiments of the present invention.

Because of drilling design improvements, it is now possible to resolve the problems involved in disposing of nuclear waste in deep human-made caverns.

The ability to economically provide a human-made cavern of sufficient size and volume, for safe disposal of substantial quantities of radioactive waste is completely feasible today. What is required is more than just the ability to store some small amount of waste in a single vertical wellbore, there are needs for storage of massive quantities of waste and the storage in limited vertical wells is not economically practical. It may be argued, that a single cavern can be disposed of below a vertical wellbore, but this single cavern wellbore approach will involve the complete drilling of a single new wellbore for every single cavern. This is an entirely unproductive operation and would be economically infeasible because of the waste of drilling effort, money, drilling materials, well completion materials like casing and drill strings and a waste of drilling time.

Some of the technical drivers that have allowed the embodiments of present invention herein to be implemented are as follows: Drilling rig design features have improved; Increased hydraulic pressure availability at the drill bit; Available drilling rig horsepower up to as much as 4,000 hydraulic horsepower; Available pump horsepower; Available Rig capacity up to 2,000,000 pounds of dead weight lift is available; High downhole drilling fluid pressures can be maintained; Drilling rig ability to pump slurries of high density, pounds per gallon (ppg) have increased considerably; and Remote and automatic control software for rig operations.

Specific technological improvements that pertain to the under-reaming operations and under-reaming equipment have allowed successful under-reaming needed to make and manage large diameter human-made caverns. Some of these improvements may include: Hydraulically actuated reamer elements expandable and retractable with pump pressure and downhole RFID (radio frequency ID) triggering with injected RFID tags; Cutter arms move upward and out simultaneously in the body; Fail-safe cutter arm retraction; Reverse actuating mechanism maintains that tool is open while drill string weight prohibits tool closure; Unrestricted fluid flow through internal diameters of the wellbore tubular goods; Roller cone cutters are specifically designed for the Drill Time Under-reamers and are consistent with downhole diameters; Reamer bodies machined from heat-treated steel bar, giving it exceptional strength; Jet nozzles near the cutters allow for cutter washing and cooling; and A variety of cutting structures is available to facilitate the reaming process.

The oilfield industries in their cementing operations and in hydraulic fracturing operations have successfully developed additives for fluids and flow control systems. These additives are designed to improve flow characteristics, pumping characteristics and may be used in the mass transfer of radioactive material in the form of slurries, gels, powders, pellets and the like radioactive materials waste forms and in very large volumes. Some of these additive improvements may include, but may not be limited to, friction reducers, viscosity reducers, stabilizers, foam reducers along with mechanical means for solids transfer efficiently.

Recapping at least some of the above noted objectives, some embodiments may provide means, systems, mechanisms, and methods for the storage and/or disposal of radioactive materials within human-made subterranean cavities within deep geological formations in manners that may be safe (for humans and the environment), economically feasible, and efficient. In some embodiments, such stored and/or disposed of radioactive materials may be retrieved for auditing, inspection, technical, and/or operational reasons. In some embodiments, such means, systems, mechanisms, and methods for the storage and/or disposal of radioactive materials within human-made subterranean cavities within deep geological formations may utilize various oilfield drilling industry technologies, including improvements and/or modifications thereto.

These and other advantages and features of the present invention are described herein with specificity so as to make the present invention understandable to one of ordinary skill in the art, both with respect to how to practice the present invention and how to make the present invention.

The preceding and other steps, objects, and advantages of the present invention will become readily apparent upon further review of the following detailed description of the preferred method as illustrated in the accompanying drawings.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

Figure 1A:
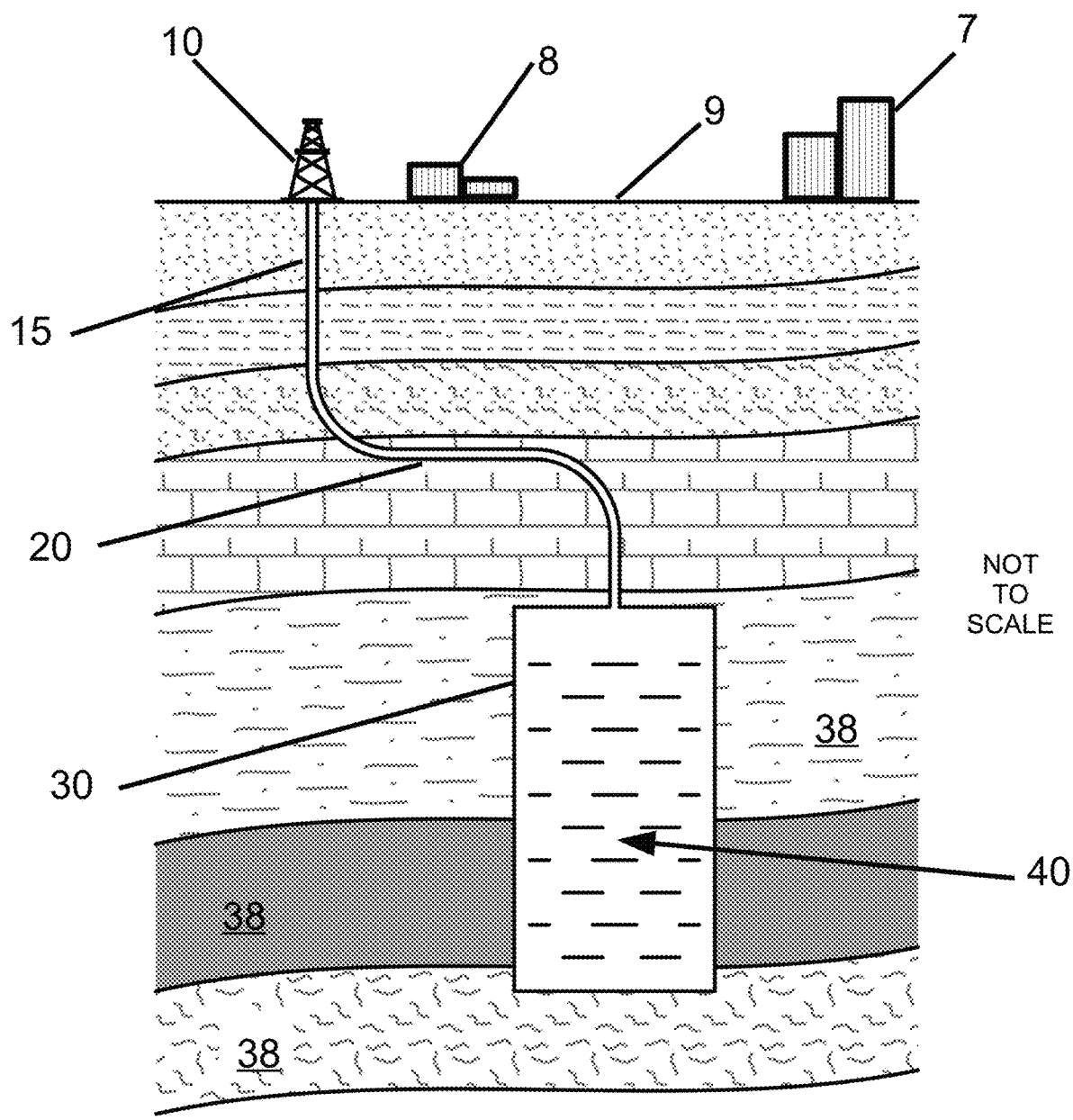
FIG. 1A may be a schematic (cross-sectional side view) showing an overview of contemplated inventive means, systems, mechanisms, and methods for the storage and/or disposal of radioactive materials within a human-made subterranean cavern within a deep geological formation; showing a surface drilling rig, a pilot wellbore, and a human-made cavern disposed of in a deep rock formation with radioactive materials stored and/or disposed of in the human-made cavern.

Table 1 may show a table of computed values in gallons of the volumetric capacity of stored radioactive waste material in various sizes of human-made caverns.

Table 2 may list some types of additives that may be used in processing and preparing the nuclear waste material to enhance the injection process and stabilize the injected nuclear material into the human-made caverns contemplated herein.

REFERENCE NUMERAL SCHEDULE 7 remote surface storage location 7
8 wellsite storage location 8
9 earth surface 9
10 drilling rig 10
11 reaming device 11
12A open cutting device 12A
12B closed cutting device 12B
13 drill string 13
15 vertical wellbore 15
20 curved S-shaped wellbore 20
21 schematic vertical distance 21
22 schematic vertical distance 22
23 angle between horizontal and slanted S-shaped wellbore section 23
30 human-made cavern 30
31 cavern interior surface 31
32 void space above stored waste in cavern 32
33 cavern wall material 33
34 entry area into cavern 34
35 protective blanket above waste in cavern 35
38 host rock or deep geological rock formation 38
40 nuclear waste 40
50 human-made cavern 50
800 method of handling nuclear waste 800
801 step of locating a wellbore site 801
802 step of drilling a vertical wellbore 802
803 step of drilling curved S-shaped wellbore 803
804 step of drilling a vertical or slanted wellbore 804
805 step of under-reaming to form cavern 805
806 step of further under-reaming to form cavern 806
807 step of conditioning human-made cavern 807
808 step of harvesting nuclear waste material 808
809 step of processing nuclear waste for transportation 809
810 step of processing nuclear waste types 810
811 step of transporting nuclear waste material 811
812 step of storing nuclear waste at well site 812
813 step of preparing waste material for injection 813
814 step of injecting nuclear waste material into human-made caverns 814

815 step of post-processing human-made cavern with injected nuclear waste 815

816 step of sealing human-made cavern and wellbore 816

DETAILED DESCRIPTION OF THE INVENTION

As noted above, embodiments of the present invention may describe means, systems, mechanisms, and methods for the storage and/or disposal of radioactive materials within human-made subterranean cavities within deep geological formations. In some embodiments, such stored and/or disposed of radioactive materials may be retrieved for auditing, inspection, technical, and/or operational reasons.

In some embodiments, a method may provide an operational method for nuclear waste disposal. Such operational methods described herein may provide more efficient methodology to allow safer, more economical and long-lasting disposal of the nuclear waste in the deep underground human-made caverns.

A very significant existing consideration should be addressed for long-term nuclear waste disposal. This is the migration of radioactive material away from a given human-made cavern system, which in turn may contaminate ground water if not addressed. Some mechanisms are needed to minimize this possibility. A long-lived technology system is required to guarantee within scientific certainty that the nuclear waste can be contained adjacent and within the human-made caverns zones.

In some embodiments, a means may be utilized that may provide for very long-lived protection from the migration of radioactive material away from the given human-made cavern.

Embodiments of the current invention may describe improved engineered barrier systems implemented with a protective medium disposed inside the walls of the human-made caverns to minimize migration of radioactive materials away from the given human-made cavern.

In this patent application, the terms "radioactive material," "radioactive waste," "nuclear material," "nuclear waste," and "high-level nuclear waste" may be used interchangeably herein. In addition, the term "waste" generally means nuclear or radioactive waste of any kind.

In this patent application, the terms "cavern," and "cavity" may be used interchangeably with a same meaning. Further, "cavern" or "cavity" may mean a cavern/cavity that may be human-made.

In this patent application, "matrix rock" and "host rock" may be used interchangeably; and may refer to a rock structure within a deep geological formation that may be hosting (housing) one or more human-made caverns.

In this patent application, the terms "well" and "wellbore" may be used interchangeably and may refer to cylindrical drilled out elements implemented in design and/or installation processes of some embodiments of the present invention.

In this patent application, the terms "single well" or "common well" may refer to a wellbore that may be shared.

In this patent application, the term "pilot" may refer to a first or initial wellbore that may be drilled out from a given drill rig 10 from earth's surface 9. Often such a pilot wellbore may be substantially vertical. In some embodiments, a pilot wellbore may be a single wellbore, a common wellbore, and/or a shared wellbore.

In this patent application, the term "ream" and "under-ream" may be used interchangeably to mean the enlarging of a wellbore or hole in a rock medium.

In this patent application, "vertical wellbores" need not be geometrically perfectly vertical; but rather may be substantially vertical (e.g., more vertical than horizontal with respect to earth's surface 9).

In this patent application, "lateral wellbore" and "horizontal wellbore" may be used interchangeably. Further, "lateral wellbores" or "horizontal wellbores need not be geometrically perfectly horizontal; but rather may be substantially horizontal (e.g., more horizontal than vertical with respect to earth's surface 9).

Note, unless an explicit reference of "vertical wellbore" or "lateral wellbore" (i.e., "horizontal wellbore") accompanies "wellbore," use of "wellbore" herein without such explicit reference may refer to vertical wellbores or lateral wellbores, or both vertical and lateral wellbores.

The novel features which are considered characteristic for various embodiments of the invention are set forth in the appended claims. Embodiments of the invention itself, however, both as to its construction and its methods of operation, together with additional objects and advantages thereof, will be best understood from the following description of the specific embodiments when read and understood in connection with the accompanying drawings. Attention is called to the fact, however, that the drawings are illustrative only, and that changes may be made in the specific construction illustrated and described within the scope of the appended claims.

These and other advantages and features of the present invention are described herein with specificity so as to make the present invention understandable to one of ordinary skill in the art, both with respect to how to practice the present invention and how to make the present invention.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

FIG. 1A may illustrate a general overview of a deep geologic nuclear waste disposal system and/or process implemented in deep human-made caverns. FIG. 1A may be a schematic (cross-sectional side view) showing an overview of contemplated inventive means, systems, mechanisms, and methods for the storage and/or disposal of radioactive materials within a human-made subterranean cavern within a deep geological formation; showing a surface drilling rig 10, vertical wellbore system 15 (e.g., a pilot wellbore), and at least one human-made cavern 30 disposed of in a deep rock formation 38 with radioactive materials 40 stored and/or disposed of in the human-made cavern 30. In some embodiments, the selected deep geologic formation 38 or host rock 38 may be igneous, metamorphic or sedimentary type formations or structural combinations of these three rock types. The selected host rock 38 may have desirable and required properties to contain radioactive waste material 40 over long time intervals and may be able to minimize migration away from the human-made caverns 30. In some embodiments, at least some of required properties of 38 may be demonstrated by petrophysical analysis.

Figure 1B:
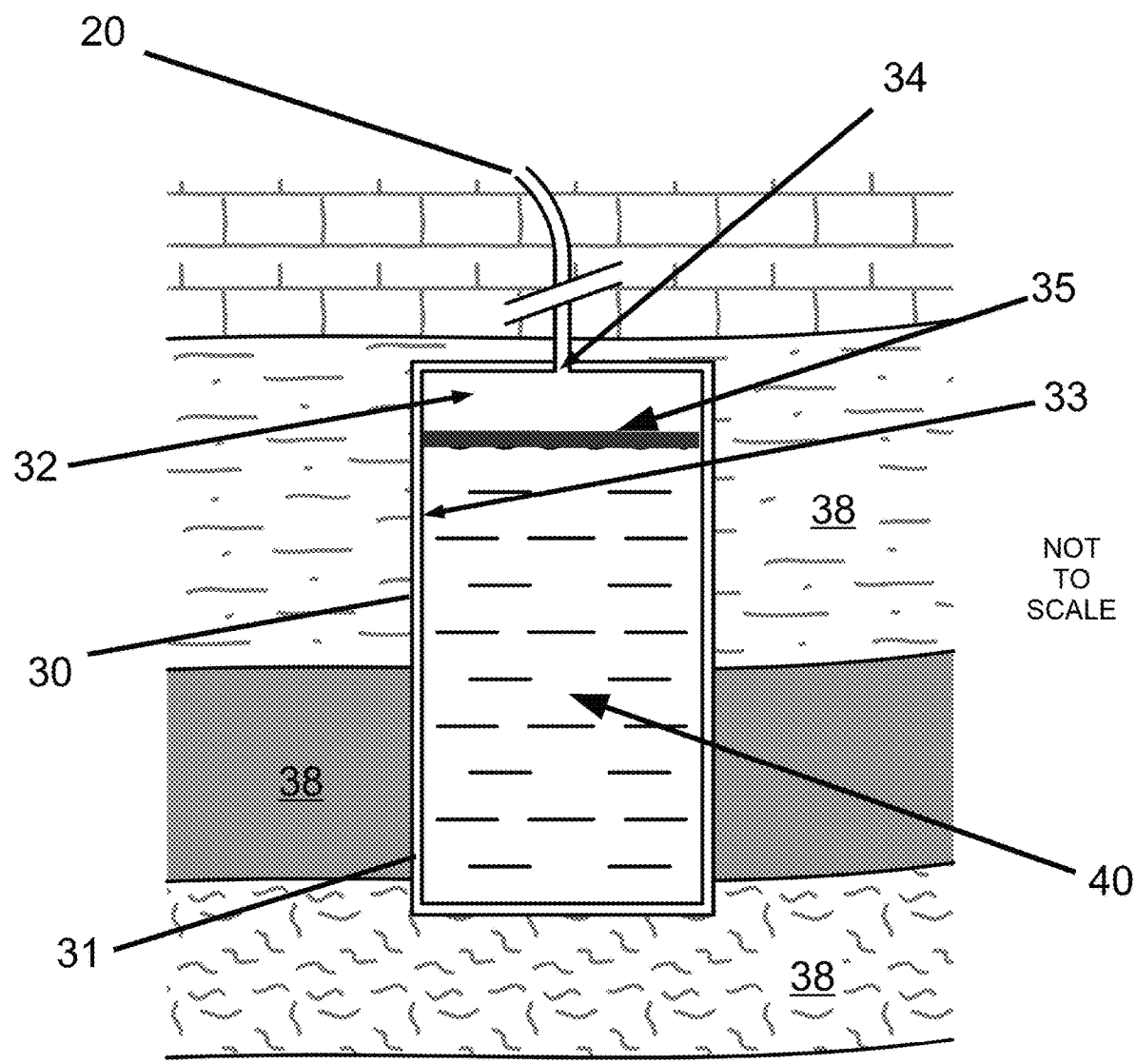
FIG. 1B may show a schematic view of a close-up vertical cross-section of a human-made storage cavern (that may be substantially cylindrical) containing radioactive material; wherein this human-made storage cavern may be located within a deep geologic formation.
Figure 1C:
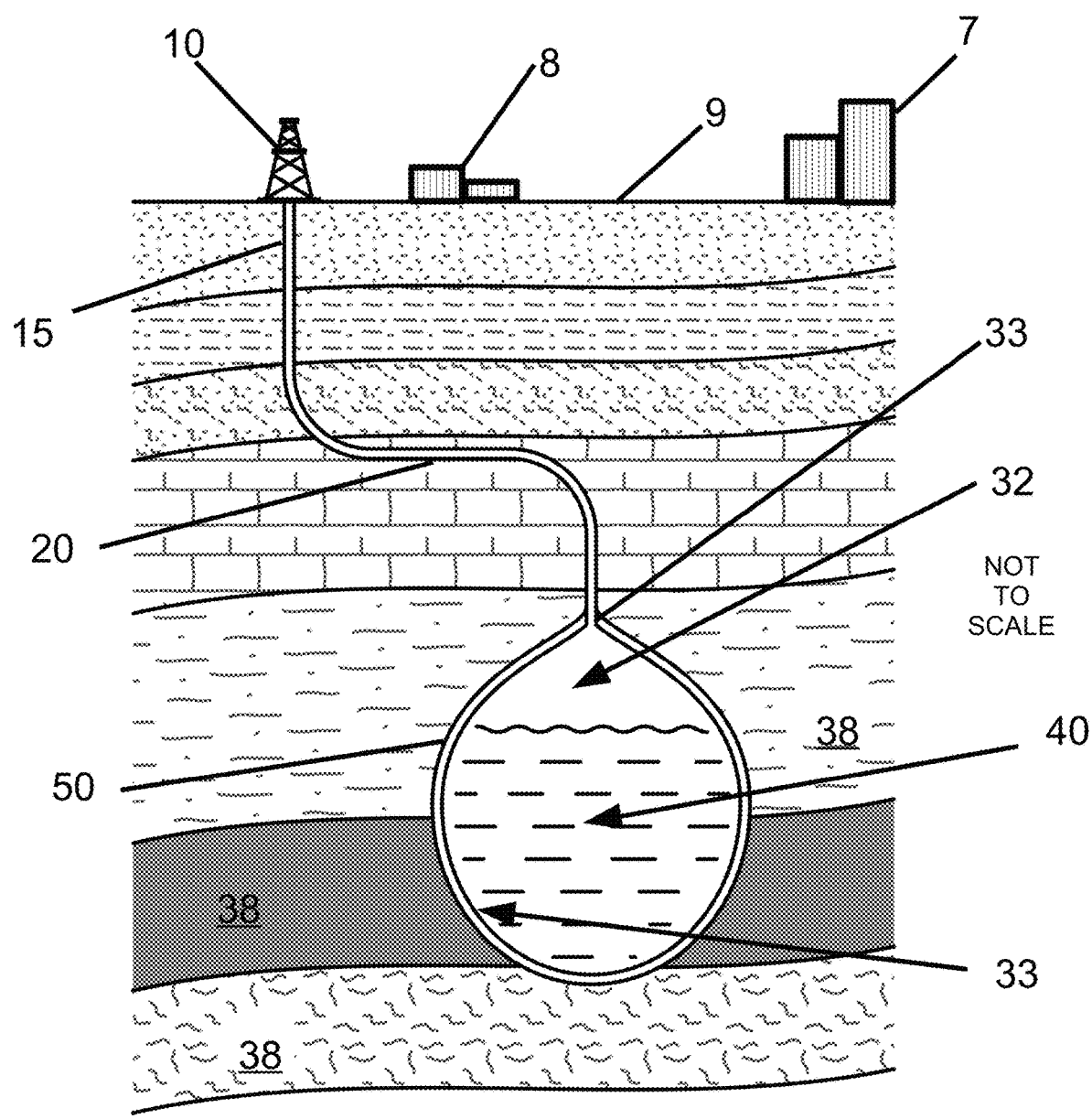
FIG. 1C may show a schematic view of a vertical cross-section of a human-made storage cavern (that may be substantially spherical) containing radioactive material; wherein this human-made storage cavern may be located within a deep geologic formation.
Figure 1D:
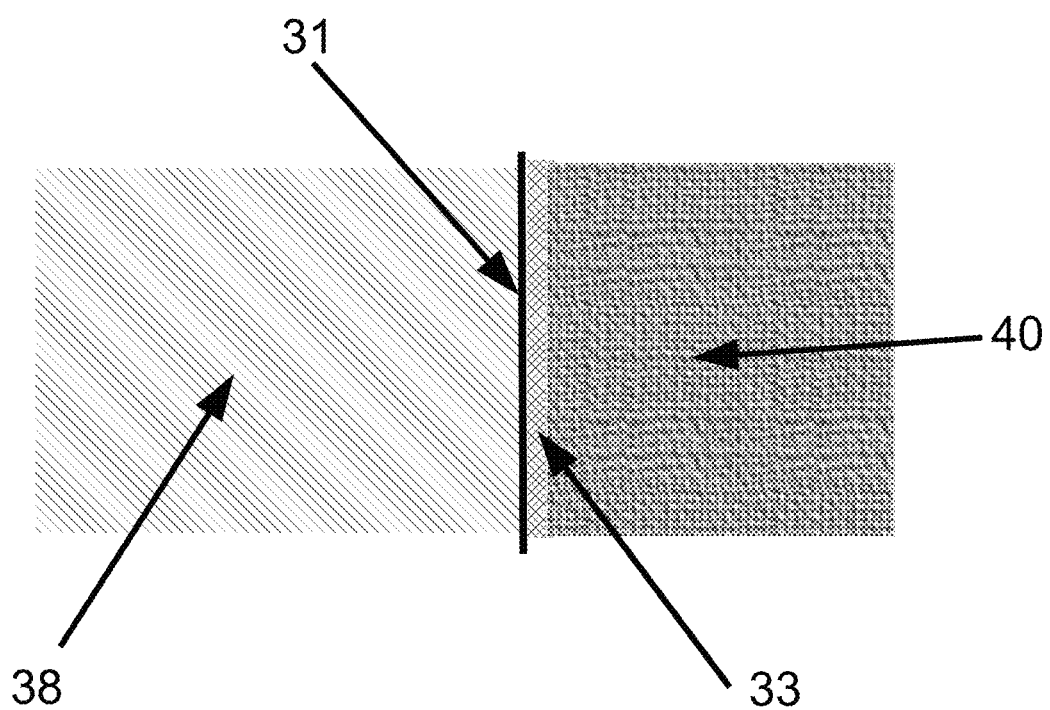
FIG. 1D may show a schematic drawing of a close-up of a region of host rock, cavern interior surface, conditioned cavern wall material (which may be composite or form composite layer), and cavern contents (e.g., radioactive material).

Continuing discussing FIG. 1A, surface drilling rig 10 may be an apparatus that drills: vertical wellbore 15, curved S-shaped wellbores 20, human-made caverns 30, and/or human-made cavity 50 (human-made cavity 50 may be shown in FIG. 1C). In some embodiments, curved S-shaped wellbores 20 need not be perfectly "S" shaped, but may be curved and/or sinuous sections of wellbore. In some embodiments, curved S-shaped wellbores 20 may extent from and/or branch off of vertical wellbore 15. In some embodiments, curved S-shaped wellbores 20 may be substantially lateral wellbores and/or substantially horizontal wellbores. In some embodiments, deep geological formation 38 (also known as host rock 38) may be located substantially from about 2,000 feet to about 30,000 feet below earth's surface 9, plus or minus 1,000 feet. In some embodiments, deep geological formation 38 may have geologic properties that make storing nuclear waste materials within deep geological formation 38 relatively safe. For example, and without limiting the scope of the present invention, in some embodiments, deep geological formation 38 may have one or more of the following geologic properties: structural closure, stratigraphically varied, low porosity, low permeability, low water saturation, and reasonable clay content. In some embodiments, it may be desirable to locate, create, form, and/or build one or more human-made cavern(s) 40 and/or human-made cavern(s) 50 within deep geological formation 38. For example, and without limiting the scope of the present invention, in some embodiments, curved S-shaped wellbore 20 may be located a predetermined depth of at least 2,000 feet below earth's surface 9. In some embodiments, nuclear waste 40 may include liquids, solids, pellets, slurries, gels, foams, combinations thereof, and/or the like.

Figure 2:
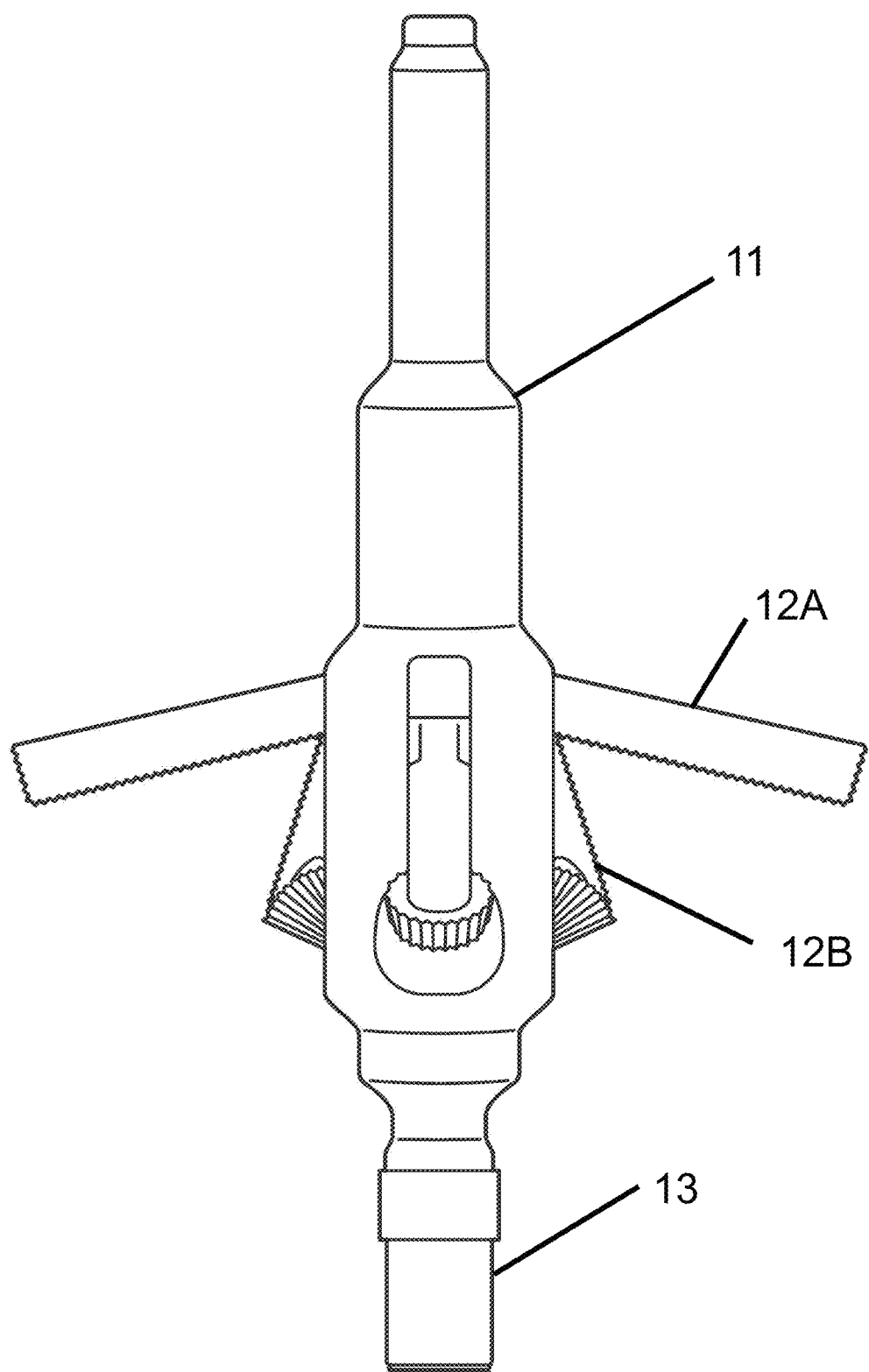
FIG. 2 may show an under-reamer drilling device, further showing partially closed cutting blades and partially open cutting blades.

Continuing discussing FIG. 1A, in some embodiments, associated usually, but sometimes at distant remote locations, may be a remote surface location 7 for nuclear waste surface storage. Some embodiments may include wellsite storage location(s) 8 for temporary nuclear waste surface storage. In some embodiments, wellsite storage location 8 may be a localized storage site/location of waste adjacent to drilling rig 10. In some embodiments, nuclear waste may be transported from remote surface location 7 to wellsite storage location 8. In some embodiments, wellsite storage location 8 may be proximate to and/or adjacent to drilling rig 10. Storage of nuclear waste in wellsite storage location(s) 8 may be intended to be temporary and not permanent. In some embodiments, drilling rig 10 may be a typical drilling rig as used in the oil-well drilling industry but with several updated modifications, such as, but not limited to, under-reaming systems as shown in FIG. 2. In some embodiments, drilling rig 10 may have supplementary features to allow safe handling of radioactive waste.

In some embodiments, it may be possible to monitor the status and location of nuclear waste 40 using RFID (radio frequency ID) tags that may be associated with nuclear waste 40. In some embodiments, it may be possible to monitor the status and location of nuclear waste 40 from remote storage location 7 to near wellsite location 8 to injection into vertical wellbore 15 to final resting within human-made cavern 30/50 by utilizing RFID tags which may inserted into (or on) nuclear waste 40. In some embodiments, RFID tagging of nuclear waste 40 may be done prior to injection into vertical wellbore 15. Current RFID tags employed in the oil and gas drilling industry are robust and miniaturized; for example, at about 2 cm long and with diameters less than 3 mm. This RFID tagging makes monitoring and location-specific determination of nuclear waste 40 possible as a safety and/or quality control feature.

In some embodiments, while at least some portions of human-made caverns 30/50 may be substantially vertical with respect to earth surface 9, in some embodiments, human-made caverns 30/50 may be slanted at an angle less than 90 degrees to the horizontal. At less than vertical or 90 degrees, human-made caverns 30/50 may hold lesser nuclear waste volumes before the nuclear waste injected into the slanted cavern structure begins to "overflow" out of the given human-made cavern 30/50 top. In some embodiments, earth surface 9 may also be referred to as terrestrial surface.

Continuing discussing FIG. 1A, in some embodiments, one or more curved S-shaped (lateral) wellbore 20 section(s) may emanate (e.g., derive) from vertical wellbore 15. In some embodiments, because the lateral (horizontal) section of curved S-shaped wellbore 20 may differ in length as more than one human-made cavern 30/50 may be implemented from a single curved S-shaped wellbore 20, a downward section of the curved S-shaped wellbore 20 may vary, get longer, to allow a sufficient length of vertical pipe section to exist such that drilling the curved portion is more easily operationally possible since sufficient weight from that vertical section of 20 is mechanically transmitted to the drill bit system of the drill rig to enhance the rate of penetration during drilling and reaming operations.

In some embodiments, vertical wellbore 15, curved S-shaped wellbore 20, and/or other wellbores of the contemplated herein may have predetermined diameters. For example, and without limiting the scope of the present invention, in some embodiments, such wellbore diameters may be selected from the range of substantially six inches to substantially 48 inches, plus or minus one inch.

In some embodiments, one or more of vertical wellbores 15, curved S-shaped wellbores 20, and/or other wellbores of the contemplated herein may have predetermined lengths. For example, and without limiting the scope of the present invention, in some embodiments, such lengths may be selected from the range of substantially five hundred feet to substantially twenty-five thousand feet.

In some embodiments, the wellbore system (e.g., one or more of vertical wellbores 15, curved S-shaped wellbores 20, and/or other wellbores of the contemplated herein) may "cased"; that is, lined with steel pipes (casing) of varying, but predetermined, sizes. In other embodiments, parts (regions, portions, and/or sections) of a given wellbore may remain without casing; e.g., "open-hole" if a given rock formation 38 may be very well consolidated.

In some embodiments, human-made cavern 30 may have a diameter from 12 inches to 120 inches, plus or minus 6 inches. In some embodiments, human-made cavern 30 may have a diameter of more than 120 inches. In some embodiments, human-made cavern 30 may have a height or vertical length of 500 feet to 10,000 feet plus or minus 100 feet.

Figure 8:
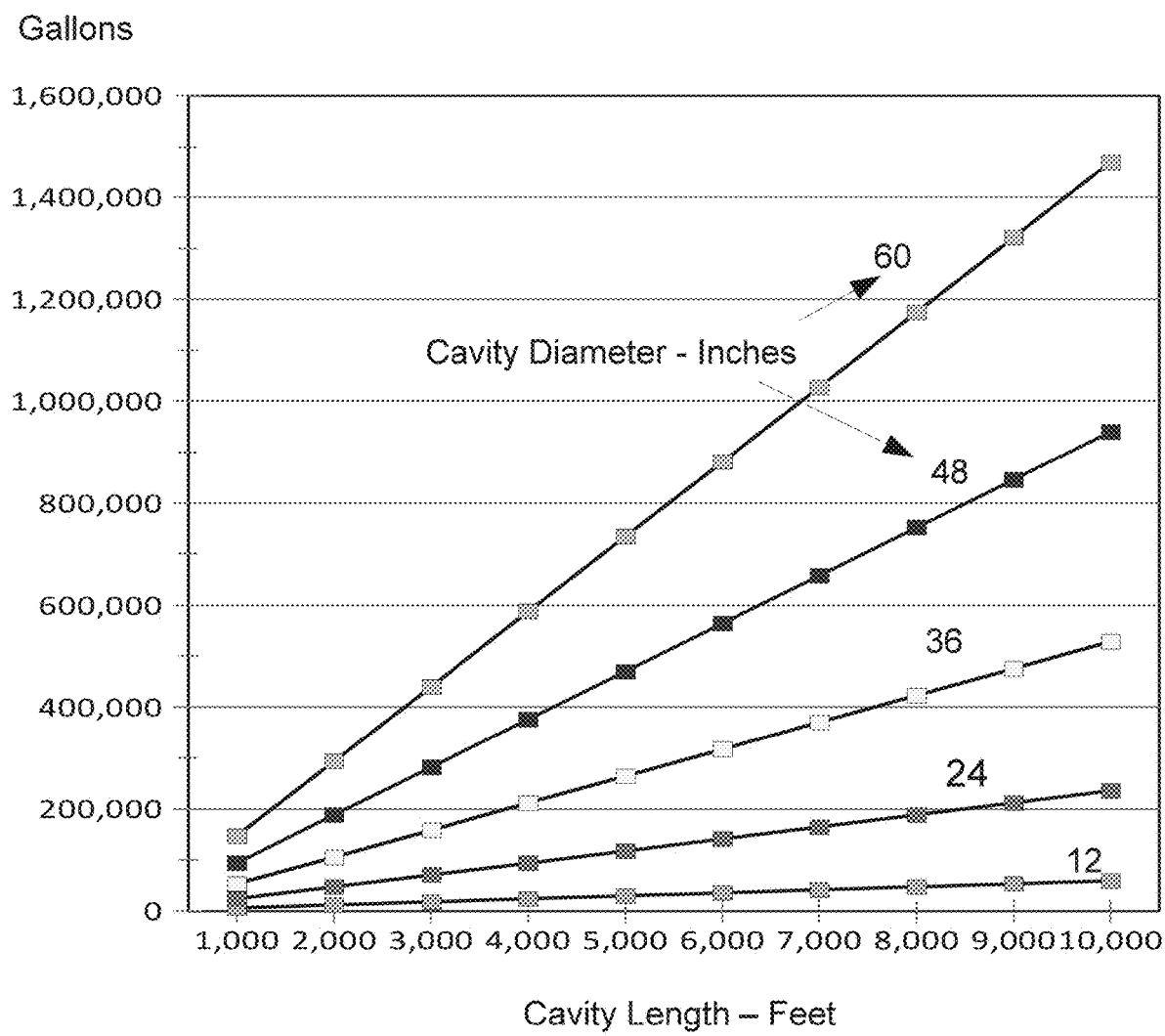
FIG. 8 may show a graph of the volumetric capacity in gallons for human-made cavities varying in length from 1,000 feet to 10,000 feet and diameters from 12 inches to 60 inches.

Table 1 and FIG. 8 may show volumetric capacities of different human-made cavities (e.g., human-made cavern 30/50) implemented in the host rock 38.

Table 1 may show a table of computed values in gallons of the volumetric capacity of stored radioactive waste material (nuclear waste 40) in various sizes of human-made caverns 30/50. See below Table 1:

|        | Diameter of Cavern | | | | |
| --- | --- | --- | --- | --- | --- |
| Length | 12 | 24 | 36 | 48 | 60 |
| 1,000 | 5,875 | 23,499 | 52,873 | 93,996 | 146,869 |
| 2,000 | 11,750 | 46,998 | 105,746 | 187,992 | 293,738 |
| 3,000 | 17,624 | 70,497 | 158,618 | 281,988 | 440,606 |
| 4,000 | 23,499 | 93,996 | 211,491 | 375,984 | 587,475 |
| 5,000 | 29,374 | 117,495 | 264,364 | 469,980 | 734,344 |
| 6,000 | 35,249 | 140,994 | 317,237 | 563,976 | 881,213 |
| 7,000 | 41,123 | 164,493 | 370,109 | 657,972 | 1,028,081 |
| 8,000 | 46,998 | 187,992 | 422,982 | 751,968 | 1,174,950 |

-continued

| | Diameter of Cavern | | | | |
|---|---|---|---|---|---|
| Length | 12 | 24 | 36 | 48 | 60 |
| 9,000 | 52,873 | 211,491 | 475,855 | 845,964 | 1,321,819 |
| 10,000 | 58,748 | 234,990 | 528,728 | 939,960 | 1,468,688 |

FIG. 1B and FIG. 1C may collectively illustrate human-made caverns 30/50 in deep geologic formations 38 (host rock 38) for the storage and/or disposal of nuclear waste 40 within human-made caverns 30/50. FIG. 1B may show human-made cavern 30; whereas, FIG. 1C may show human-made cavern 50 (see also FIG. 4 for human-made caverns 50). In some embodiments, human-made caverns 30 may be substantially cylindrical in shape. In some embodiments, human-made caverns 50 may be substantially spherical in shape. In some embodiments, human-made caverns 30 may be implemented in host rock 38 by under-reaming drilling processes using reaming device 11 of constant diameter. See FIG. 2 for reaming device 11. Continuing discussing FIG. 1C, in some embodiments, human-made caverns 50 may be implemented by a more complicated under-reaming process in which the diameter of reamer device 11 may be varied while drilling human-made caverns 50 so that a spheroid shape may be formed rather than a cylindrical shaped cavern. In this embodiment, the diameter of reaming device 11 changes from smaller to larger, then decreases to smaller, as reaming device 11 is drilled down vertically into the host rock 38 where the spherical cavern is desired to be formed. This variation of diameter while drilling may produce a substantially spherical shaped cavern which would be capable of containing a larger volume of waste per unit cavern height. However, this operation though practical would be more complicated than drilling a cylindrical cavern of constant diameter. A given human-made caverns 50 (that may be substantially spherical) may potentially hold more nuclear waste 40 than a comparable human-made caverns 30 (that may be substantially cylindrical), for a given vertical height, depending on the diameter variations within the system.

Discussing FIG. 1B, in some embodiments, a given human-made cavern 30/50 may comprise entry area 34, void space 32, and/or protective blanket 35. In some embodiments, entry area 34 may define a boundary between curved S-shaped wellbore 20 and human-made cavern 30/50. In some embodiments, entry area 34 may be located at a top of a given human-made cavern 30/50. In some embodiments, void space 32 may be void space (head space) between entry area 34 and nuclear waste 40. In some embodiments, void space 32 may be void space (head space) between entry area 34 and protective blanket 35. In some embodiments, protective blanket 35 may substantially cover over nuclear waste 40 in a given human-made cavern 30/50. In some embodiments, protective blanket 35 may be some protective medium, such as, but not limited to, a bentonite clay or a radionuclide absorber/inhibitor material that may be injected to remain above nuclear waste 40. This protective blanket 35 may be a two-way barrier which may slow down physical migration of radioactive particles, fluid material, and other soluble compounds into or away from nuclear waste 40 mass that is stored in human-made caverns 30/50. In some embodiments, protective blanket 35 may be disposed in the given human-made caverns 30/50 between nuclear waste 40 and entry area 34.

Further, referring to FIG. 1A, FIG. 1B, FIG. 1C, and FIG. 1D, human-made caverns 30/50 may be substantially "voids" which may have been implemented in host rock 38. In such human-made caverns 30/50, an interior surface 31 of the given human-made cavern 30/50 may be conditioned by applying some adhesive cavern wall material 33 to interior surface 31 which may be capable of making interior surface 31 impermeable, protective, and long-lasting. The cavern wall material 33 may be composed of different materials forming a composite wall (or composite layer) which may be applied by methods that include spraying, jetting or mechanical means which posit cavern wall material 33 internally on interior surfaces 31 of human-made caverns 30/50. See e.g., FIG. 1D.

In some embodiments, when host rock 38 may be sufficiently consolidated and impermeable to fluid migration, then human-made caverns' 30/50 walls interior surface 31 may not need to be conditioned with cavern wall material 33. In such situations, the walls of human-made caverns 30/50 may remain without cavern wall material 33 being applied thereon.

FIG. 2 may illustrate a reaming device 11 used in the under-reaming operations in oil well drilling. Reaming device 11 may be a type of downhole drill device. Reaming device 11 may be used to enlarge a borehole below a point during an oil well drilling operation. Reaming device 11 may be strategically positioned either above the drill bit or above a specialized bottom hole assembly run inside the existing borehole. Numerous designs exist, in sizes varying from a few inches to more than 50 inches for a given reaming device 11. Reaming devices 11 are typically used in a variety of oil drilling operations.

Continuing discussing FIG. 2, reaming device 11 may typically be composed of a body connected to a drill string 13 and of extensible (pivotable) mobile parts, cutting device 12, wherein these cutting devices may be arms, blocks, blades and/or cutters. Some reaming devices 11 may have three such cutting devices 12. These cutting devices 12 may exist in two main configurations, an open configuration, designated open cutting device 12A in FIG. 2; and a close configuration, designated closed cutting device 12B in FIG. 2. closed cutting device 12B may be retracted in the body of reaming device 11 during the descent and extended downhole for the reaming operation by application of hydraulic pressures from the drill rig flow system combined with some mechanical means. Cutter devices 12 may be closed when reaming device 11 may be run into a given wellbore (such as vertical wellbore 15 and/or curved S-shaped wellbore 20) as closed cutter device 12A and then opened under pressure loading, electronically by RFID, and/or other electronic means and/or mechanically to open cutter device 12B when the reaming operation is in operation. In some cases, the under-reaming system may be activated by a pre-programmed RFID tag, sent down the wellbore to the reamer apparatus to trigger reamer activity via the reamer control module which energizes reamer's the cutter system. The reaming technology is such that today (2019) multiple reamers can be run in tandem and they can be independently controlled to allow rapid and efficient under-reaming of the host rock 38 up to the prescribed designed diameter to form human-made cavern 30/50.

Figure 3A:
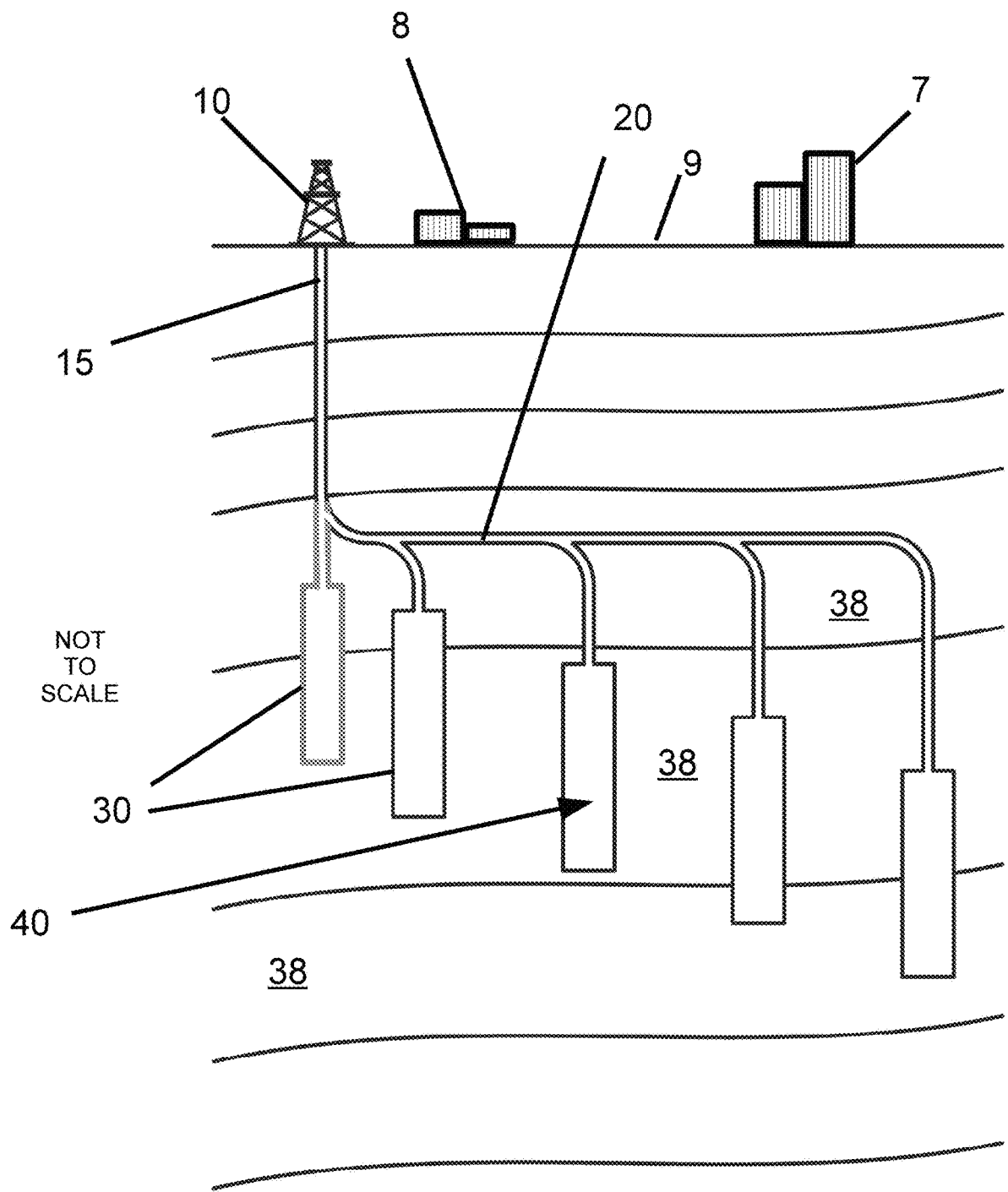
FIG. 3A may be a schematic (cross-sectional side view) showing an overview of contemplated inventive means, systems, mechanisms, and methods for the storage and/or disposal of radioactive materials within human-made subterranean cavities within deep geological formations; showing multiple human-made caverns (that may be substantially cylindrical) in a deep geologic formation.
Figure 3B:
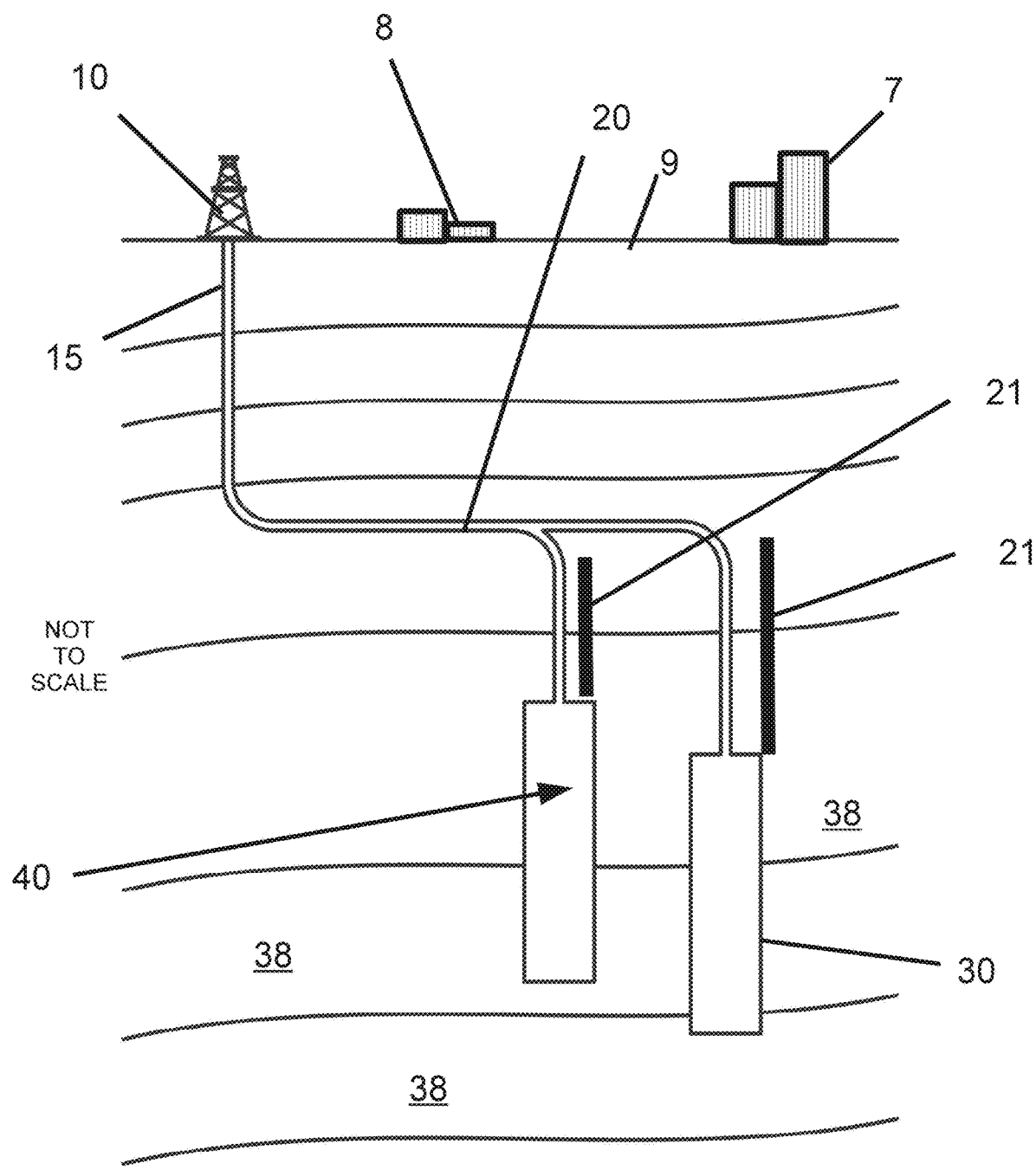
FIG. 3B may show a schematic of a "S-shaped" wellbore section which may be beneficial in drilling operations.
Figure 3C:
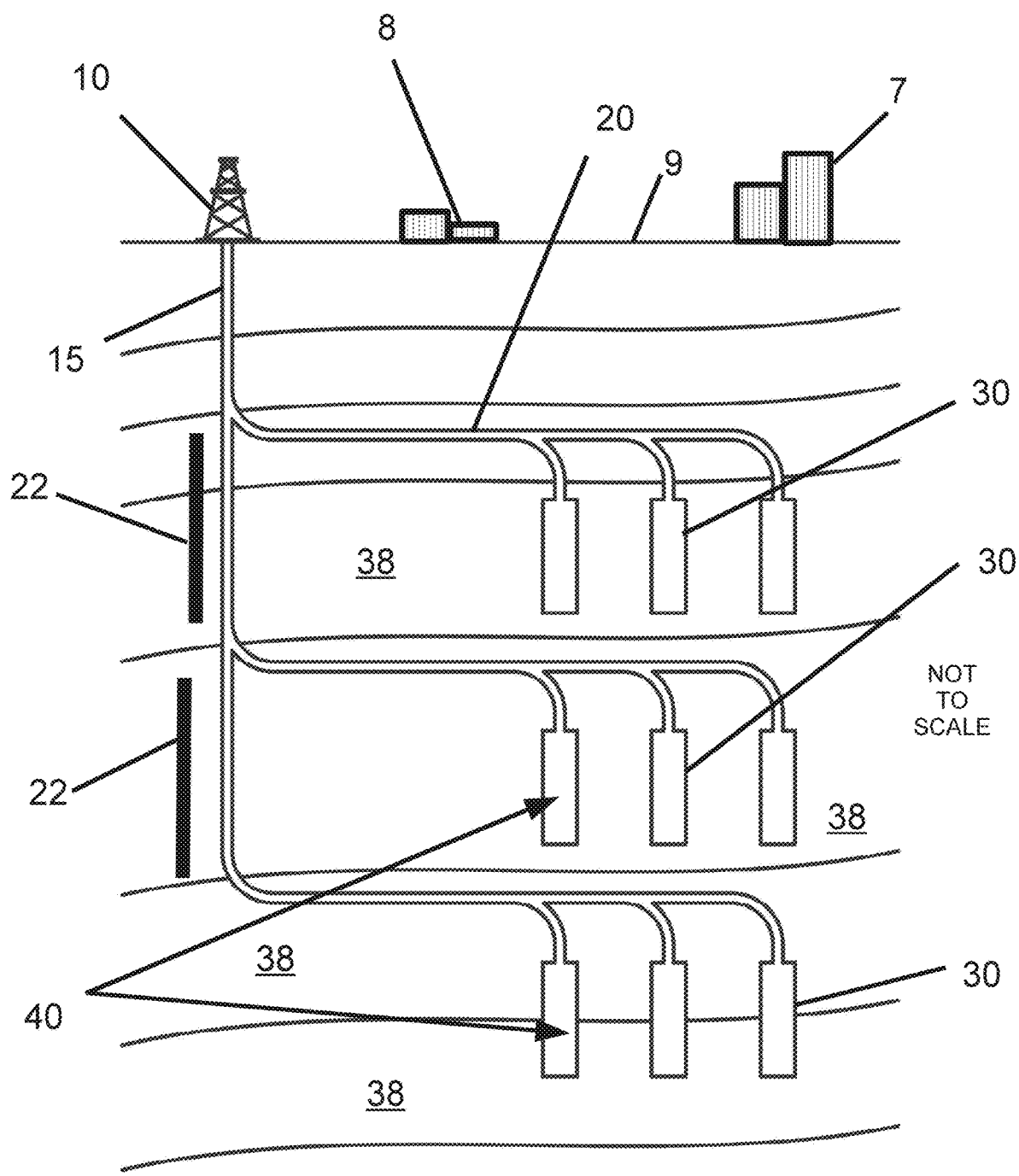
FIG. 3C may show a schematic vertical cross-section of multiple human-made caverns strategically implemented at different vertical levels from a same pilot wellbore.

FIG. 3A, FIG. 3B, and FIG. 3C may collectively illustrate embodiments wherein a plurality of human-made caverns 30 may be implemented in deep geological formations 38 by first drilling from (pilot) vertical wellbore 15 followed by drilling at least one curved S-shaped wellbore 20 from vertical wellbore 15. Using reaming devices 11 one or more human-made caverns 30 may be formed from the at least one curved S-shaped wellbore 20. A vertical (and/or substantially vertical) human-made cavern 30 may then be implemented by drilling with the under-reamer system utilizing one or more reaming devices 11. The under-reamer system may be inserted and retrieved from the given curved S-shaped wellbore 20. The curved S-shaped wellbore 20 sections/zones may be extended through host rock 38 zone where a second human-made cavern 30 may then be implemented in host rock 38; and so on for further additional human-made caverns 30. Such an operation and embodiment may be shown in FIG. 3A where five human-made caverns 30 may be drilled sequentially (serially) by under-reaming to form each human-made cavern 30 from a single, common, and shared curved S-shaped wellbore 20 in host rock 38 at progressively further lateral (horizontal) distances from the original vertical wellbore 15 along the single, common, and shared curved S-shaped wellbore 20. Each such serially located human-made cavern 30, at its top may have a section of vertical wellbore connecting to the single, common, and shared curved S-shaped wellbore 20. Note, while FIG. 3A shows five such serially located human-made caverns 30, less or more than four such human-made caverns 30 may be implemented in this manner.

Also note in FIG. 3A, in some embodiments a first (left most in FIG. 3A) human-made cavern 30/50 may be implemented directly below vertical wellbore 15 and without a section of curved S-shaped wellbore 20.

It is further illustrated in FIG. 3B where two sets of adjacent human-made caverns 30 may be drilled out at respectively deeper locations in host rock 38. This vertical extension of the distal end, furthest from the vertical wellbore 15, of the single, common, shared curved S-shaped wellbore 20 may allow for a larger length of vertical drill string 13 (also known as drill pipe). This length of drill pipe adds weight on the drill bit for better drilling effect. This extension, shown by the schematic distance 21, provides a larger weight on bit (WOB) for better drilling operations. The length of schematic distance 21 shown may be variable. This schematic distance 21 may be from 100 feet to 2,000 feet. In some embodiments, schematic distance 21 may be a vertical distance from a top of a given human-made cavern 30 to the lateral portion of its curved S-shaped wellbore 20.

Furthermore, FIG. 3C illustrates an embodiment with a plurality of groupings of human-made caverns 30 that may be implemented at different depths in host rock 38. A distance between different groupings of human-made caverns 30 may be denoted by vertical schematic distance 22 in FIG. 3C. In some embodiments, vertical schematic distance 22 may be from 100 feet to 2,000 feet. In some embodiments, off of different depths of vertical wellbore 15 may at least one different curved S-shaped wellbore 20 for each such different depth, wherein each such different depth may be separated by vertical schematic distance 22. And then from each such different curved S-shaped wellbore 20 may be one or more human-made caverns 30 (or at least one additional human-made cavern 30). These different curved S-shaped wellbore 20 sections may be referred to as a second (or a third, a fourth, etc.) substantially lateral and horizontal wellbore that emanates from the substantially vertical wellbore 15, wherein at least one additional human-made cavern 30 may extends from the second substantially lateral and horizontal wellbore.

As shown in FIG. 3C a plurality of human-made caverns 30 may be disposed in a pattern, ultimately emanating from the initial (pilot) vertical wellbore 15. This pattern shown in FIG. 3C may allow multiple human-made caverns 30 to be economically developed within a reasonable distance of the initial vertical wellbore 15. This approach may optimize the total volumetric capacity available for nuclear waste disposal from a given earth surface 9 location. This approach may optimize surface operations for nuclear waste handling. A single facility may provide the operations needed to process nuclear waste prior to injection into multiple human-made caverns 30/50 through a single wellhead at the surface (earth surface 9 or terrestrial surface) and the vertical wellbore 15. This arrangement may save labor, materials, time, and money.

Figure 3D:
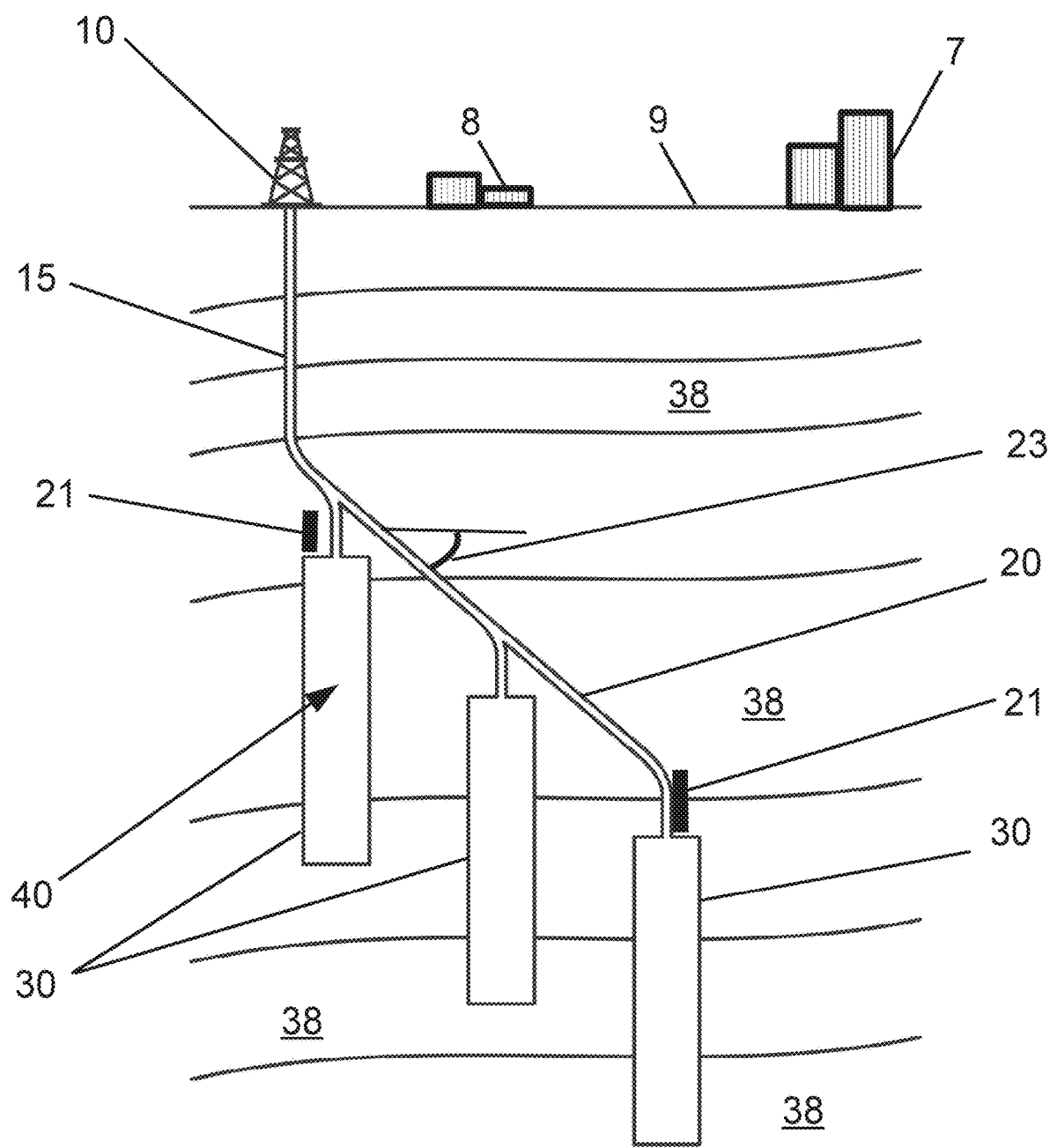
FIG. 3D may show a schematic of a "S-shaped" wellbore section which may be implemented at a slanted angle to the horizontal plane.

As shown in FIG. 3D a plurality of human-made caverns 30/50 may be disposed along slanted, i.e., non-horizontal curved S-shaped wellbore 20 sections of varying lengths with angles from and including 45° (degree) to 75° (degree) with respect to the horizontal plane. In some embodiments, angle 23 may be between horizontal and slanted S-shaped wellbore 20 section and may be from and including 45° (degree) to 75° (degree) with respect to the horizontal plane. This slanted embodiment of curved S-shaped wellbore 20 section(s) may allow for easier injection of viscous or semi-solid nuclear waste material 40 from the surface (earth surface 9) because a slanted implementation allows for gravity to help the injection process of radioactive waste 40 into human-made caverns 30/50. This can be effective when slurries of viscous materials are being injected into the vertical wellbore 15 system. These slanted section(s) implementations (e.g., of curved S-shaped wellbore 20 sections at angle 23) may be made similarly to the other human-made caverns 30/50 located in deep geologic rock formations 38 described herein.

Figure 4:
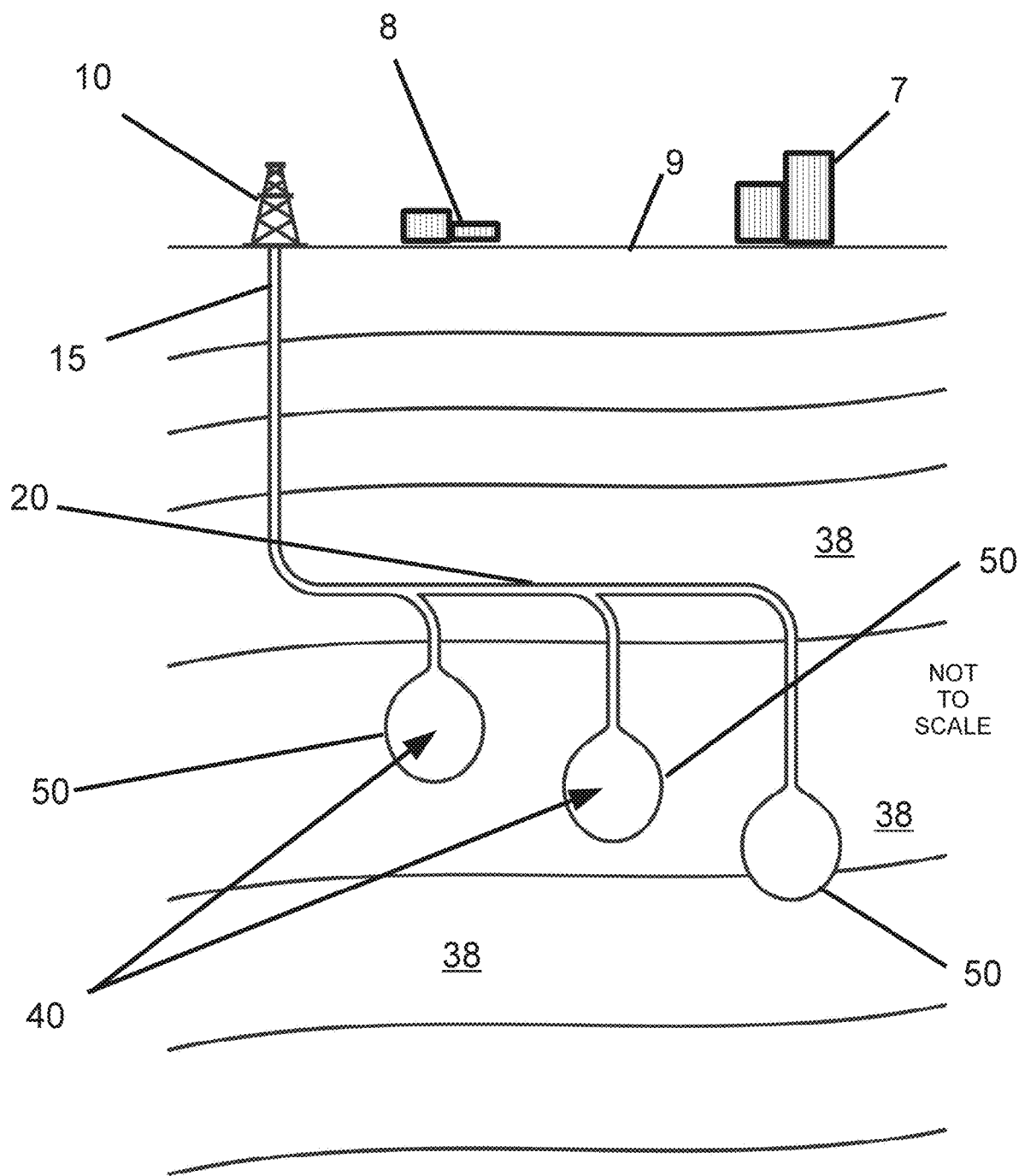
FIG. 4 may show a schematic vertical cross-section of several human-made caverns (that may be substantially spherical) located within a deep geologic formation.

FIG. 4 may illustrate a cross-section of an embodiment in which a plurality of human-made caverns 50 (that may be substantially spherical) may be implemented in host rock 38. FIG. 4 may illustrate an embodiment wherein a plurality of human-made caverns 50 may be implemented in deep geological formations 38 by first drilling from (pilot) vertical wellbore 15 followed by drilling at least one curved S-shaped wellbore 20 from vertical wellbore 15. Using reaming devices 11 one or more human-made caverns 50 may be formed from at least one curved S-shaped wellbore 20. The under-reamer system may be inserted and retrieved from the given curved S-shaped wellbore 20. The curved S-shaped wellbore 20 sections/zones may be extended through host rock 38 zone where a second human-made caverns 50 may then be implemented in host rock 38; and so on for further additional human-made caverns 50. Such an operation and embodiment may be shown in FIG. 4 where three human-made caverns 50 may be drilled sequentially (serially) by under-reaming to form each human-made caverns 50 from a single, common, and shared curved S-shaped wellbore 20 in host rock 38 at progressively further lateral (horizontal) distances from the original vertical wellbore 15 along the single, common, and shared curved S-shaped wellbore 20. Each such serially located human-made cavern 50, at its top may have a section of vertical wellbore connecting to the single, common, and shared curved S-shaped wellbore 20. Note, while FIG. 4 shows three such serially located human-made caverns 50, less or more than three such human-made caverns 50 may be implemented in this manner.

Figure 5A:
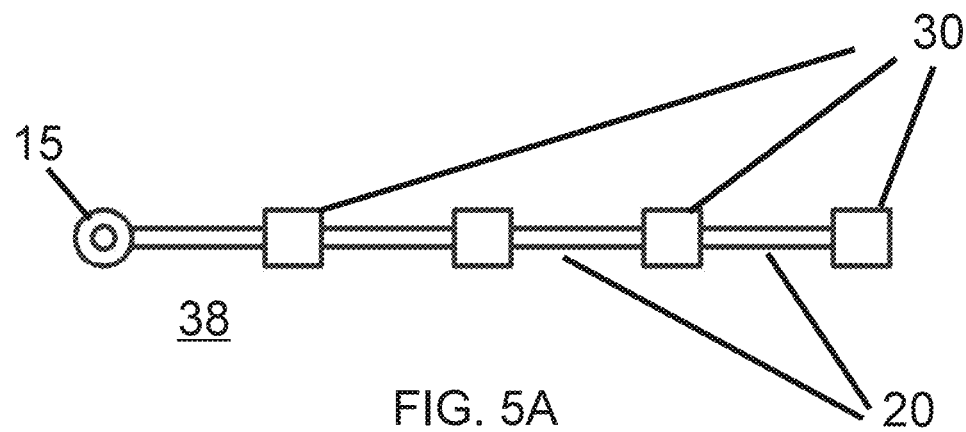
FIG. 5A may show a plan view of a linear combination of multiple human-made caverns extending away from a common pilot wellbore.
Figure 5B:
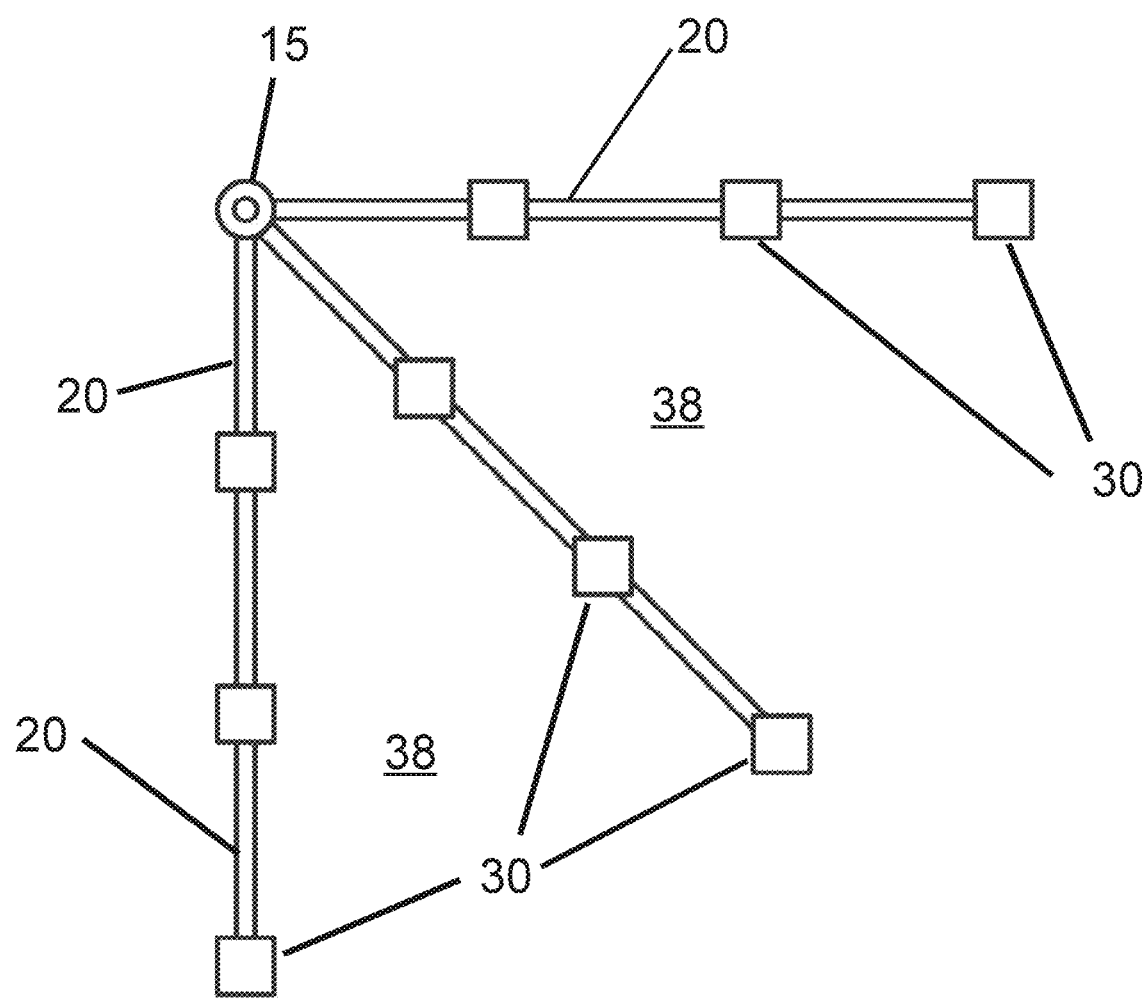
FIG. 5B may show a partial plan view of multiple human-made caverns disposed in a radial pattern around a common pilot well.

FIG. 5A and FIG. 5B collectively may illustrate distribution patterns, as plan views (top views), of human-made caverns 30/50 from a single, common, shared vertical wellbore 15 (focal vertical well) within a given host rock 38. A quantity of human-made caverns 30/50 and their aerial distributions (positions) "azimuth-wise" and "linear-radially" away from a center of vertical wellbore 15 may be optimized to provide an efficient nuclear waste disposal system and process. Curved S-shaped wellbores 20 shown in FIG. 5A and FIG. 5B may be substantially lateral (horizontal), but with some vertical portion descending to each given human-made cavern 30/50.

Figure 6A:
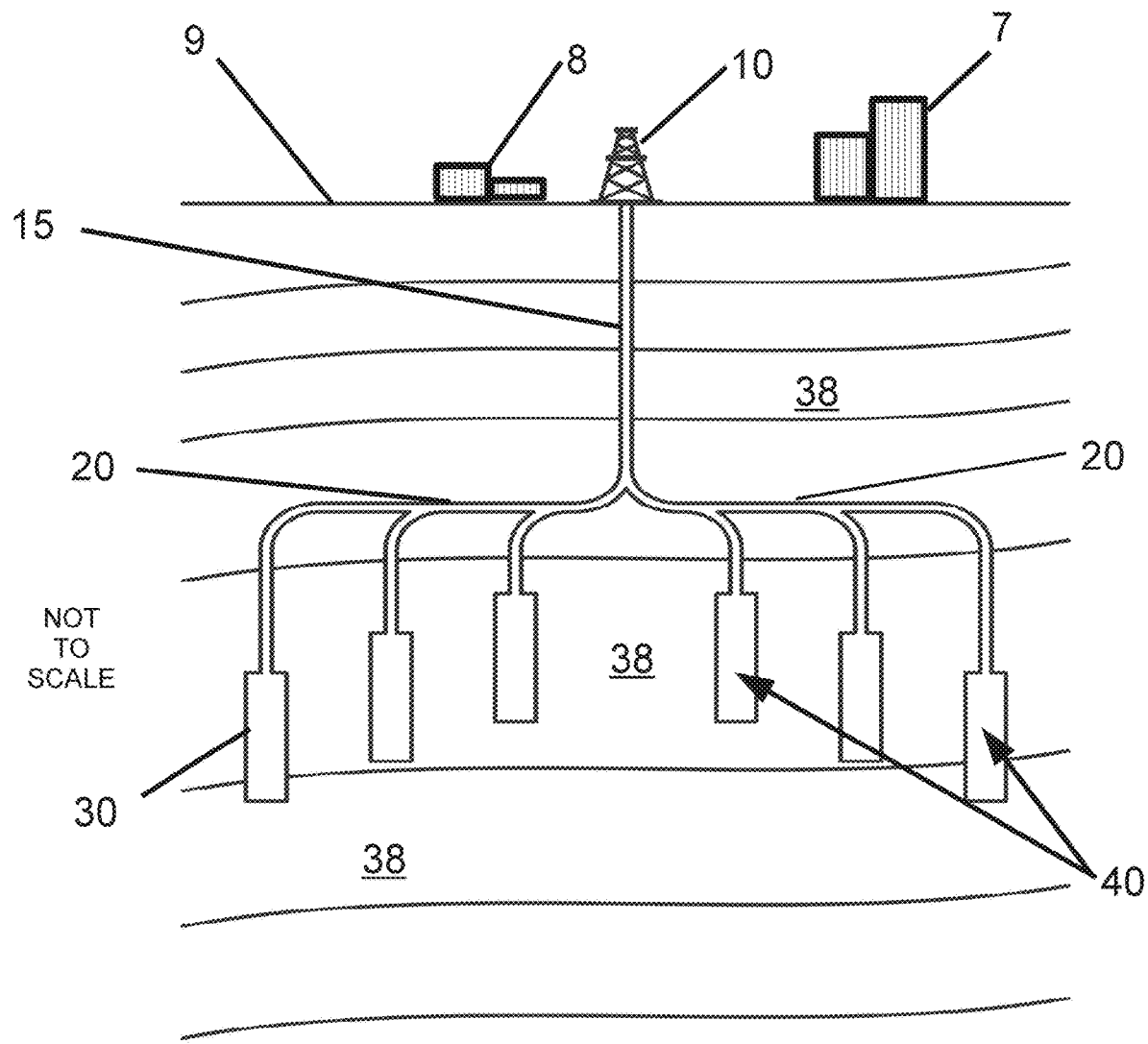
FIG. 6A may show a schematic of a vertical cross-section of multiple human-made caverns arranged laterally from a single (common) pilot wellbore.
Figure 6B:
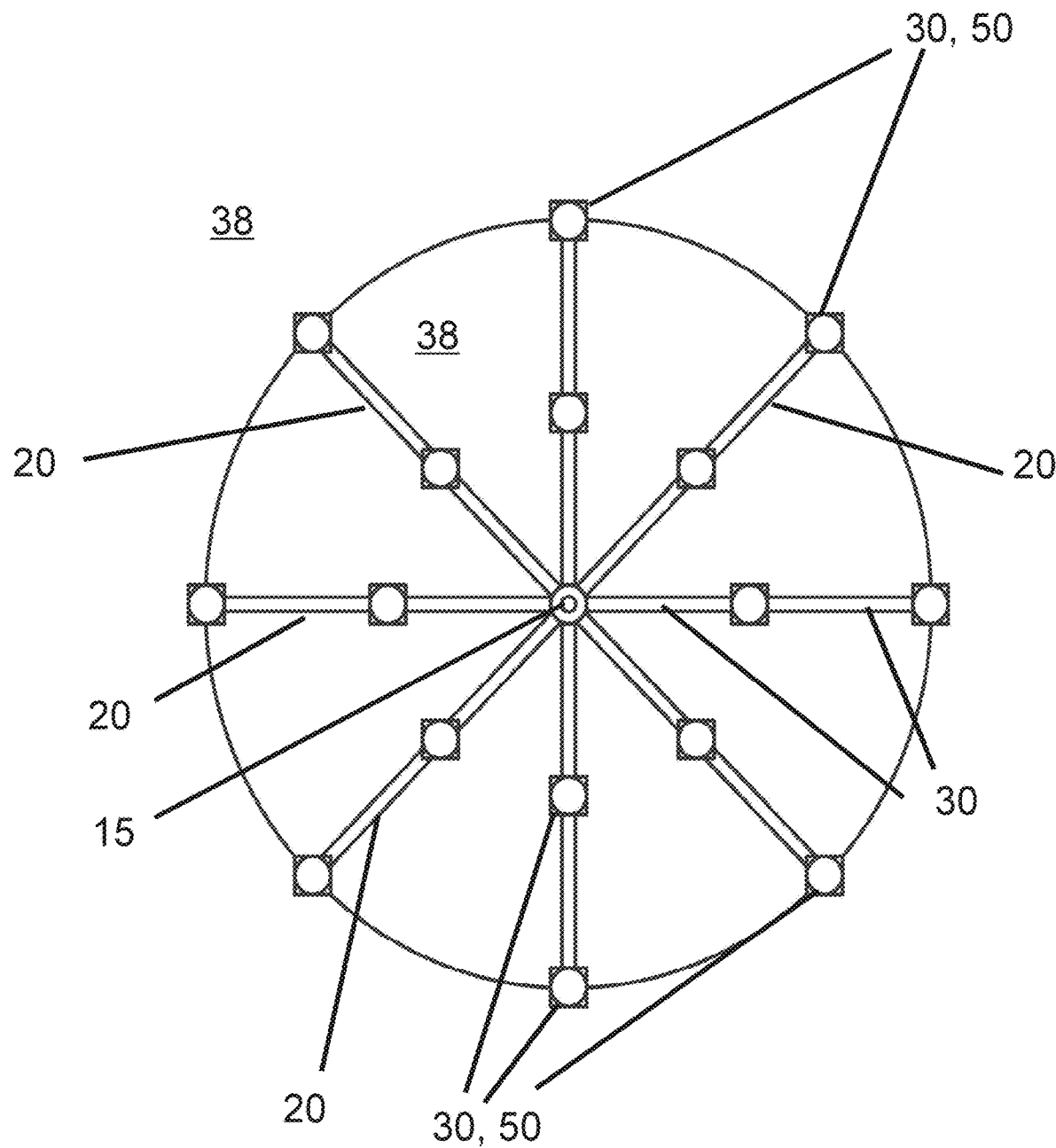
FIG. 6B may show a plan view of multiple human-made caverns radially disposed in concentric forms around a single (common) pilot wellbore.

FIG. 6A and FIG. 6B supplement embodiments noted above in FIG. 5A and FIG. 5B. FIG. 6A may show a vertical cross-section of a plurality of human-made caverns 30/50 which may be implemented from a single, common, and shared vertical wellbore 15 within host rock 38. FIG. 6A may show positional distributions of human-made caverns 30/50 by staging human-made caverns 30/50 both vertically and laterally in host rock 38. Note, in FIG. 6A, in some embodiments, there may be two (or more) different curved S-shaped wellbores 20 emanating from the single, common, and shared vertical wellbore 15.

FIG. 6B may be a plan view (top view) which may illustrate a distribution pattern of human-made caverns 30/50 arranged around a substantially centrally located single, common, and shared vertical wellbore 15. In some embodiments, human-made caverns 30/50 may be arranged radially from the substantially centrally located single, common, and shared vertical wellbore 15. In some embodiments, human-made caverns 30/50 may be arranged concentrically around the substantially centrally located single, common, and shared vertical wellbore 15. In such configurations, the radial spokes may be one or more curved S-shaped wellbores 20 emanating from the substantially centrally located single, common, and shared vertical wellbore 15. In this manner, nuclear waste disposal systems and processes may be optimized by explicitly determining proper radius and lateral distances to implement the human-made caverns 30/50 within a given host rock 38 such that costs and volumetric capacity may be optimized by selecting best values for each variable design parameter.

Figure 7:
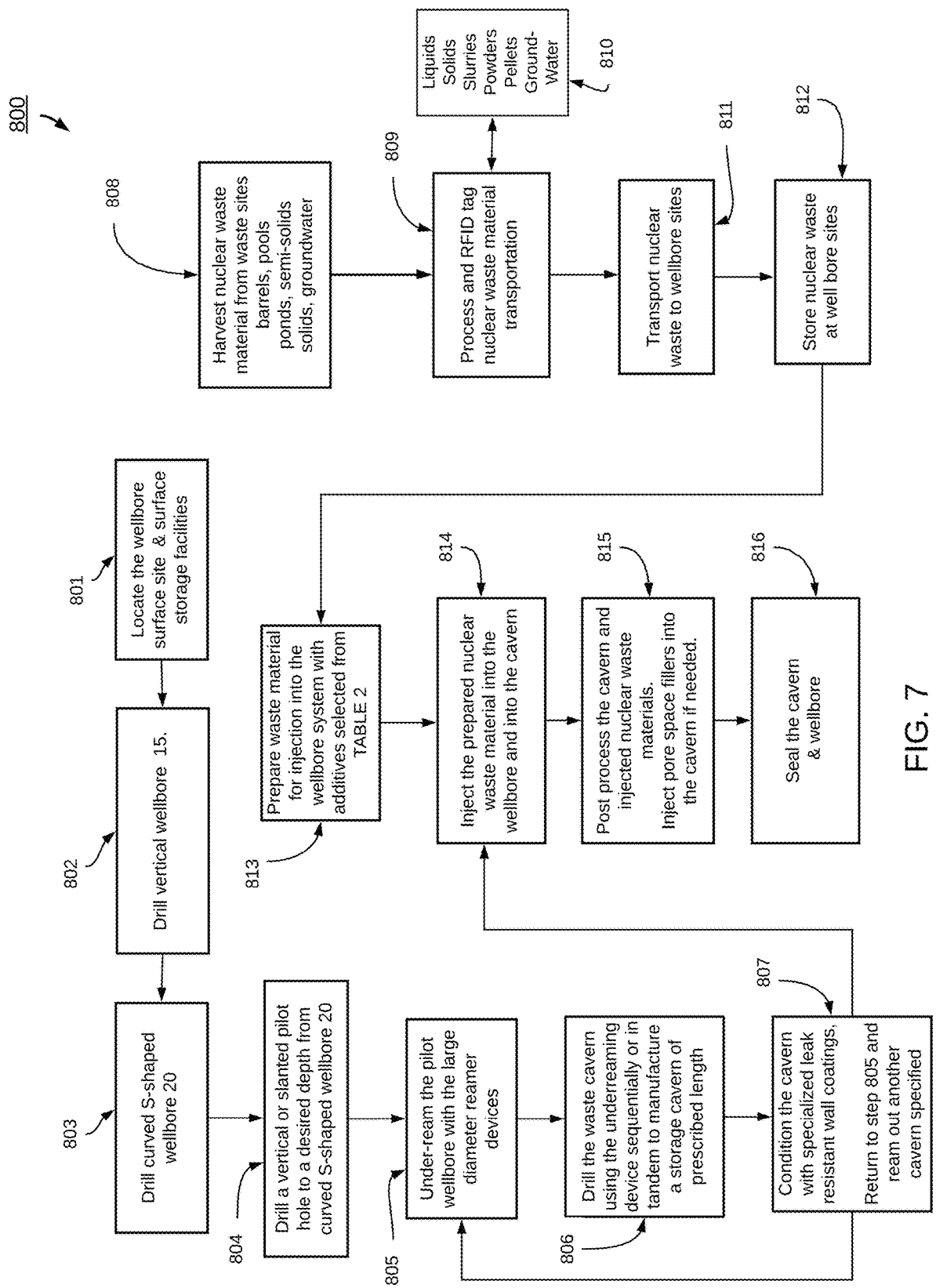
FIG. 7 may show a flow chart of a process of disposing of radioactive material in human-made caverns in deep geologic formations.

FIG. 7 may depict a flowchart of method 800. In some embodiments, method 800 may be a method of disposing of (storing) radioactive or nuclear waste 40 in deep human-made caverns 30/50 located in a deep geological rock formation 38. In some embodiments, method 800 may comprise steps 801 to step 816. Some steps may be mandatory, while other steps may be optional. For example, step 807 of conditioning cavern interior surface 31 with cavern wall material 33 may not be necessary for some types of host rock 38. Some steps may be done out of the order noted in FIG. 7.

Continuing discussing FIG. 7, in some embodiments, step 801 may be a step of locating a wellbore site on earth surface 9. In some embodiments step 801 may involve geological and geophysical analysis to determine the best subterranean location of host rock 38. In some embodiments, step 801 may involve implementing (setting up and preparing for drilling operations) drilling rig 10 at the picked site on earth surface 9. In some embodiments, step 801 may include implementation of surface facilities, such as, wellsite storage location 8 to receive and store nuclear waste 40 harvested from original remote surface storage location(s) 7. In some embodiments, successful completion of step 801 may then progress into step 802.

Continuing discussing FIG. 7, in some embodiments, in step 802, vertical wellbore 15 may be drilled from drilling rig 10 on earth surface 9 to a prescribed (predetermined) depth of 2,000 to 30,000 feet. In some embodiments, successful completion of step 802 may then progress into step 803.

Continuing discussing FIG. 7, in some embodiments, in step 803, the drilling operation continues in which the at least one curved S-shaped wellbore 20 sections may be drilled. In some embodiments, the initial portions of the at least one curved S-shaped wellbore 20 sections may be substantially lateral and/or horizontal with respect to vertical wellbore 15. Away from vertical wellbore 15, portions of the at least one curved S-shaped wellbore 20 sections may descend at least partially vertically in preparation for locating a given human-made cavern 30/50 to be formed. The at least one curved S-shaped wellbore 20 sections may vary in length and may allow a plurality of human-made caverns 30/50 to be sequentially drilled from the extending the at least one curved S-shaped wellbore 20 sections as they reach further away from the original vertical wellbore 15. In some embodiments, successful completion of step 803 may then progress into step 804.

Continuing discussing FIG. 7, in some embodiments, in step 804, a mostly vertical section of the curved S-shaped section 20 may be drilled into host rock 38 to initiate formation of a top of a given human-made cavern 30/50. A length of this downward vertical section of the curved S-shaped wellbore 20 section may be prescribed (predetermined) such that multiple human-made caverns 30/50 may be efficiently drilled from such extended sections of the curved S-shaped wellbore 20 interval. In some embodiments, successful completion of step 804 may then progress into step 805.

Continuing discussing FIG. 7, in some embodiments, in step 805 reaming device 11 may be run into vertical wellbore 15 then into the applicable curved S-shaped wellbore 20 section and into the downhole vertical section where it may be desired for form a given human-made cavern 30/50 in host rock 38. At this location in host rock 38 where it may be desired to form the given human-made cavern 30/50, reaming device 11 may be activated and used to form that given human-made cavern 30/50. For example, this may involve deploying, extending, and/or activating cutting devices 12. One or more reaming devices 11 (e.g., in tandem) may be utilized to form the given human-made cavern 30/50 in host rock 38. In some embodiments, successful completion of step 805 may then progress into step 806.

Continuing discussing FIG. 7, in some embodiments, in step 806 the under-reaming process may continue either directly or sequentially in phases to ream out human-made caverns 30/50 in host rock 38 to a depth from 500 feet to 10,000 feet of vertical extent and with diameters up to 120 inches. In some embodiments, successful completion of step 806 may then progress into step 807.

Continuing discussing FIG. 7, in some embodiments, in step 807 a given human-made cavern 30/50 drilled (formed) in step 806 may be conditioned internally with cavern wall material 33. Conditioning may be done to seal cavern interior surfaces 31 against radionucleotide migration. In some embodiments, the conditioning process in step 807 may be designed to modify cavern interior surfaces 31 with adhesive coatings of cavern wall material 33. In some embodiments, application of cavern wall material 33 to cavern interior surfaces 31 may be done by operational means from surface systems with wireline or similar oilfield practices equipment. The types of coatings of cavern wall material 33 available for physical application to cavern interior surfaces 31 may include, but may not be limited to, cements, epoxies, ceramics, clays, paints, combinations thereof, and/or the like. The conditioned human-made cavern 30/50 may be in a state ready to accept the radioactive nuclear waste 40 processed on the surface. In some embodiments, successful completion of step 807 may then progress into step 805 or into step 814. In some embodiments, step 807 of conditioning cavern interior surface 31 with cavern wall material 33 may not be necessary for some types of host rock 38; and in such situations, step 806 may progress to step 805 or step 814.

Continuing discussing FIG. 7, in some embodiments, if needed (e.g., is specified), after step 807 (or after step 806 when step 807 is not utilized) is completed, method 800 may return to step 805 to ream out an additional human-made cavern 30/50 at other/different locations implemented in host rock 38 at a further distance along the given shared and common curved S-shaped wellbore 20 section. This may be the situation when the specification calls for a predetermined quantity of human-made caverns 30/50 to be formed.

Continuing discussing FIG. 7, in some embodiments, in step 808, the radioactive nuclear waste 40 may be harvested and collected from remote surface storage location 7 where nuclear waste 40 may have been previously disposed of in a myriad of container systems and forms. In some embodiments, successful completion of step 808 may then progress into step 809.

Continuing discussing FIG. 7, in some embodiments, in step 809, nuclear waste 40 available for eventual disposal in one or more human-made caverns 30/50 may be processed from remote surface storage location 7 into a more manageable form as shown in step 810. In step 809, nuclear waste material 40 may be tagged with pre-programmed RFID tags. This RFID tagging allows location-specific monitoring of nuclear waste 40 material more intelligently from remote surface storage location 7 until final disposal down the disposal vertical wellbore 15. In some embodiments, RFID tagging may be omitted. In some embodiments, RFID tagging may be done prior to step 809. In some embodiments, RFID tagging may be done up to step 813, but before step 814. In some embodiments, RFID tagging may be replaced with other positional tagging technologies. In some embodiments, successful completion of step 809 may then progress into step 811.

Continuing discussing FIG. 7, in some embodiments, in step 810, nuclear waste 40 may be converted (processed) into forms that may be more manageable, such as, but not limited to, substantially solidified, substantially liquids, substantially gels, substantially pellets, substantially powders, substantially slurries, substantially foam, substantially treated water, combinations thereof, and/or the like to enable easier transport and eventual sequestration in human-made caverns 30/50. Step 810 may feed into step 809.

Continuing discussing FIG. 7, in some embodiments, in step 811, the processed nuclear waste 40 may be transported by truck, rail, barge, and/or other legally permitted means to the well site determined in step 801 and/or to wellsite storage location 8. In some embodiments, successful completion of step 811 may then progress into step 812.

Continuing discussing FIG. 7, in some embodiments, in step 812, the transported nuclear waste 40 may be temporarily stored at wellsite storage location 8. In some embodiments, successful completion of step 812 may then progress into step 813.

Continuing discussing FIG. 7, in some embodiments, in step 813, nuclear waste 40 may be processed to maximize ease of pumping and injection into human-made caverns 30/50. Such processing operations may include additional steps of adding various chemicals, such as, but not limited to, friction reducers, stabilizers, foam reducers, and/or other specialized chemicals selected from Table 2 (see below), to allow for easy handling and processing of nuclear waste 40 that is to be disposed of (stored) in human-made caverns 30/50. These chemicals may aid the disposal process by stabilizing nuclear waste 40 and at the same time minimizing corrosive or deleterious effects of the injected fluids on the steel tubular products in the wellbore system which may cause future wellbore breakdown.

Table 2 may list some types of additives that may be used in processing and preparing the nuclear waste 40 material to enhance the injection (pumping) process and stabilize the injected nuclear waste 40 material into human-made caverns 30/50 described herein. See below Table 2:

| Additives to Waste |
|---|
| Acids |
| Anti-Sludge Agents |
| Bactericide |
| Clay Control |
| Corrosion Inhibitors |
| Crosslinking Agents |
| Emulsifiers |
| Emulsion Breakers |
| Fluid Loss Agents |
| Foaming Agents |
| Friction Reducers |
| Gelling Agents |
| Oxygen Scavangers |
| Ph Adjusters |
| Scale Inhibitors |
| Surfactants |
| Retarders |

In some embodiments, step 813 may be omitted, in which case, step 812 may progress to step 814.

Continuing discussing FIG. 7, in step 814, the processed nuclear waste 40 along with its additives (if any) may be injected (pumped) into vertical wellbore 15, into curved S-shaped wellbore 20, and finally into a given human-made caverns 30/50 (which may be internally conditioned in some embodiments). This injection process may continue until human-made caverns 30/50 may be filled with a precalculated quantity of nuclear waste 40. In some embodiments, in step 814, radioactive material 40 may injected into at least one human-made cavern 30/50, wherein radioactive material 40 may be in one or more of the following formats: substantially liquid, substantially slurry, substantially powder, substantially pellets, substantially rocks, substantially bricks, combinations thereof, and/or the like. In some embodiments, successful completion of step 814 may then progress into step 815.

Continuing discussing FIG. 7, in step 815, injected nuclear waste 40 may be post-processed inside human-made caverns 30/50. In some instances, if the injected nuclear waste 40 may comprise solid pellets and/or particulate fragments, there may be pore space between such particles. In some embodiments, this pore space may be filled by injecting fillers like clays or cements to fill these voids, minimizing such void space and fixing nuclear waste 40 in place. In some embodiments, after injecting at least some radioactive material 40 into at least one human-made cavern 30/40, void space porosity in the radioactive material 40 may be at least partially reduced by injection of one or more of cement and/or clay into radioactive material 40 within at least one human-made cavern 30/40; thus, filling at least some of this void space porosity. In some embodiments, the system and/or method may comprise this one or more cement or clay. In some embodiments, these injected fillers can be radionuclide absorbent/captor materials which may hold radioactive particles in place and slow down migration away from human-made caverns 30/50. In some embodiments, in step 815, a blanket 35 of some protective medium like a bentonite clay or a radionuclide absorber/inhibitor material may be injected to remain above nuclear waste 40. See e.g., FIG. 1B for blanket 35. This protective blanket 35 may be a two-way barrier which may slow down physical migration of radioactive particles, fluid material, and other soluble compounds into or away from nuclear waste 40 mass that is stored in human-made caverns 30/50. In some embodiments, successful completion of step 815 may then progress into step 816.

In some embodiments, step 815 may be omitted, in which case, step 814 may progress to step 816.

Continuing discussing FIG. 7, in step 816 filled human-made caverns 30/50 and vertical wellbore 15 may be sealed by mechanical means, including by, but not limited to, cement plugs, downhole packers, clays, combinations thereof, and/or the like. Drilling rig 10 may be removed and the wellhead may be plugged. In some embodiments, method 800 may conclude with step 816.

FIG. 8 may show a graph of the volumetric capacity in gallons for human-made cavities 30 varying in length from 1,000 feet to 10,000 feet and diameters from 12 inches to 60 inches.

Note in some embodiments, any human-made cavern 30 described herein may be replaced a human-made cavern 50. For example, and without limiting the scope of the present invention any human-made cavern 30 shown in FIG. 1A, FIG. 1B, FIG. 3A, FIG. 3B, FIG. 3C, FIG. 5A, FIG. 5B, FIG. 6A, and/or FIG. 6B, may be replaced with a human-made cavern 50. Likewise, in some embodiments, any human-made cavern 50 described herein may be replaced with a human-made cavern 30. For example, and without limiting the scope of the present invention any human-made cavern 50 shown in FIG. 1C, FIG. 4, and/or FIG. 6B, may be replaced with a human-made cavern 30. Similarly, any distribution patter of human-made caverns 30 shown in the figures may be implemented with human-made caverns 50; and vice-versa.

Note some embodiments show two or more human-made caverns 30/50, such as shown in figures FIG. 3A through FIG. 3D, FIG. 4, FIG. 5A, FIG. 5B, FIG. 6A, and FIG. 6B. In such embodiments, a given/specific human-made cavern 30/50 selected from the two or more human-made caverns 30/50 may referred to, such as, but not limited to, first human-made cavern, second human-made cavern, next human-made cavern, at least one additional human-made cavern, sequentially, numerically, and the like. In some embodiments, such designations as first, second, next, additional, and the like with respect to the two or more human-made caverns 30/50, may not refer to an order in which the two or more human-made caverns 30/50 were formed; but instead simply, the spatial relationship(s) of the given/specific human-made cavern 30/50 with respect to other of the two or more human-made caverns 30/50.

Means, systems, mechanisms, and methods for the storage and/or disposal of radioactive materials (e.g., nuclear waste) within human-made subterranean cavities within deep geological formations have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A system for storing radioactive material in at least one human-made cavern wherein the at least one human-made cavern is located within a deep geological rock formation in the Earth's crust; wherein the system comprises the at least one human-made cavern; wherein the at least one human-made cavern is formed by first drilling a substantially vertical wellbore from a terrestrial surface, then drilling a substantially lateral and horizontal wellbore emanating from the substantially vertical wellbore, then directing a portion of the substantially lateral and horizontal wellbore downwards with respect to the terrestrial surface, and then at this downwards location using at least one under-reaming device to under-ream to a predetermined depth to form the at least one human-made cavern.

2. The system according to claim 1, wherein the deep geological rock formation is one or more of: igneous basement rock, metamorphic rock, sedimentary rock, or a combination of these rocks.

3. The system according to claim 1, wherein the deep geological rock formation is located at least 2,000 feet below a terrestrial surface.

4. The system according to claim 1, wherein the system further comprises the substantially vertical wellbore and the substantially lateral and horizontal wellbore.

5. The system according to claim 1, wherein the predetermined depth of the at least one human-made cavern is from 500 feet to 10,000 feet.

6. The system according to claim 1, wherein the at least one human-made cavern formed from the under-reaming has a diameter of substantially twelve inches to substantially 120 inches.

7. The system according to claim 1, wherein the substantially vertical wellbore has a diameter from substantially six inches to substantially 48 inches.

8. The system according to claim 1, wherein the substantially lateral and horizontal wellbore extends away from the substantially vertical wellbore for at least 500 feet to 25,000 feet.

9. The system according to claim 1, wherein the at least one human-made cavern comprises two or more human-made caverns that are arranged serially along and connected to the substantially lateral and horizontal wellbore.

10. The system according to claim 9, wherein the two or more human-made caverns are arranged with a first human-made cavern selected from the two or more human-made caverns closer to the substantially vertical wellbore with a next human-made cavern selected from the two or more human-made caverns located further from the substantially vertical wellbore; wherein the first human-made cavern is located closer to the terrestrial surface and the next human-made cavern is located further from the terrestrial surface.

11. The system according to claim 1, wherein a second substantially lateral and horizontal wellbore emanates from the substantially vertical wellbore, wherein at least one additional human-made cavern extends from the second substantially lateral and horizontal wellbore.

12. The system according to claim 1, wherein the at least one human-made cavern comprises a plurality of human-made caverns, wherein the plurality of human-made caverns are arranged radially around the substantially vertical wellbore.

13. The system according to claim 1, wherein the at least one human-made cavern comprises a plurality of human-made caverns, wherein the plurality of human-made caverns are arranged concentrically around the substantially vertical wellbore.

14. The system according to claim 1, wherein the at least one human-made cavern is substantially cylindrical shaped or substantially spherical shaped.

15. The system according to claim 1, wherein a cavern interior surface of the at least one human-made cavern is conditioned by coating at least a portion of the cavern interior surface with a cavern wall material; wherein the system further comprises the cavern wall material.

16. The system according to claim 15, wherein the coating is accomplished by one or more of spraying, jetting, or painting the at least the portion of the cavern interior surface with the cavern wall material.

17. The system according to claim 15, wherein the cavern wall material is one or more of: a cement, an epoxy, an adhesive, or a ceramic.

18. The system according to claim 1, wherein the radioactive material is injected into the at least one human-made cavern, wherein the radioactive material is in one or more of the following formats: substantially liquid, substantially slurry, substantially powder, substantially pellets, substantially rocks, or substantially bricks.

19. The system according to claim 1, wherein prior to injecting the radioactive material into the at least one human-made cavern, the radioactive material is tagged with one or more tags for location and positional monitoring of the radioactive material;

wherein the system further comprises the one or more tags.

20. The system according to claim 1, wherein after injecting the radioactive material into the at least one human-made cavern, void space porosity in the radioactive material is at least partially filled by injection of one or more of cement or clay into the radioactive material within the at least one human-made cavern; wherein the system further comprises the one or more cement or clay.

21. The system according to claim 1, wherein after injecting the radioactive material into the at least one human-made cavern, a protective blanket is injected into a headspace of the at least one human-made cavern to cover over the radioactive material.

22. The system according to claim 1, wherein prior to transporting the radioactive material to a site for injecting into the at least one human-made cavern, the radioactive material is processed into one or more of the following formats: substantially liquified, substantially solidified, substantially pelletized, substantially slurried, substantially in gel form, or substantially in foam form.

* * * * *